United States Patent
Pope et al.

(10) Patent No.: US 9,112,752 B2
(45) Date of Patent: *Aug. 18, 2015

(54) NETWORK INTERFACE AND PROTOCOL

(75) Inventors: Steve Leslie Pope, Cambridge (GB); Derek Edward Roberts, Cambridge (GB); David James Riddoch, Coventry (GB); David Julian Clarke, Harston (GB)

(73) Assignee: Solarflare Communications, Inc., Irvine, CA (US)

( * ) Notice: Subject to any disclaimer, the term of this patent is extended or adjusted under 35 U.S.C. 154(b) by 81 days.

This patent is subject to a terminal disclaimer.

(21) Appl. No.: 12/910,391

(22) Filed: Oct. 22, 2010

(65) Prior Publication Data

US 2011/0040897 A1 Feb. 17, 2011

Related U.S. Application Data

(63) Continuation of application No. 10/661,765, filed on Sep. 15, 2003, now Pat. No. 7,844,742.

(30) Foreign Application Priority Data

Sep. 16, 2002 (GB) .................................. 0221464.1

(51) Int. Cl.
*G06F 15/16* (2006.01)
*H04L 29/12* (2006.01)
*G06F 9/54* (2006.01)

(52) U.S. Cl.
CPC .......... *H04L 29/12009* (2013.01); *G06F 9/544* (2013.01); *G06F 9/545* (2013.01); *H04L 29/12783* (2013.01); *H04L 61/35* (2013.01)

(58) Field of Classification Search
CPC ... G06F 15/16; G06F 9/544; H04L 29/12009; H04L 29/12783; H04L 61/35

USPC ........................................................... 709/250
See application file for complete search history.

(56) References Cited

U.S. PATENT DOCUMENTS

| 4,393,443 A | 7/1983 | Lewis ........................... 711/207 |
| 5,272,599 A | 12/1993 | Koenen |

(Continued)

FOREIGN PATENT DOCUMENTS

| EP | 620521 | 10/1994 |
| GB | WO00/67131 | 11/2000 |

(Continued)

OTHER PUBLICATIONS

D. Riddoch, S. Pope, D. Roberts, G. Mapp, D. Clarke, D. Ingram, K. Mansley, and A. Hopper. Tripwire: A Synchronisation Primitive for Virtual Memory Mapped Computing. In Proceedings of the 4th International Conference on Algorithms and Architectures for Parallel Processing (ICA3PP), 2000.*

(Continued)

*Primary Examiner* — June Sison
(74) *Attorney, Agent, or Firm* — Rothwell, Figg, Ernst & Manbeck, P.C.

(57) ABSTRACT

A communication interface for providing an interface between a data link and a data processor, the data processor being capable of supporting an operating system and a user application, the communication interface being arranged to: support a first queue of data received over the link and addressed to a logical data port associated with a user application; support a second queue of data received over the link and identified as being directed to the operating system; and analyze data received over the link and identified as being directed to the operating system or the data port to determine whether that data meets one or more predefined criteria, and if it does meet the criteria transmit an interrupt to the operating system.

22 Claims, 12 Drawing Sheets

(56) References Cited

U.S. PATENT DOCUMENTS

| | | |
|---|---|---|
| 5,325,532 A | 6/1994 | Crosswy et al. |
| 5,946,189 A | 8/1999 | Koenen et al. |
| 6,018,763 A | 1/2000 | Hughes et al. |
| 6,067,595 A | 5/2000 | Lindenstruth ................. 710/307 |
| 6,098,112 A | 8/2000 | Ishijima et al. |
| 6,111,894 A * | 8/2000 | Bender et al. ................. 370/469 |
| 6,160,554 A | 12/2000 | Krause |
| 6,246,683 B1 | 6/2001 | Connery et al. .............. 370/392 |
| 6,304,945 B1 | 10/2001 | Koenen |
| 6,314,532 B1 | 11/2001 | Daudelin et al. |
| 6,321,310 B1 | 11/2001 | McCarthy et al. |
| 6,349,035 B1 | 2/2002 | Koenen |
| 6,438,130 B1 | 8/2002 | Kagan et al. |
| 6,502,203 B2 | 12/2002 | Barron et al. |
| 6,530,007 B2 | 3/2003 | Olarig et al. |
| 6,667,918 B2 | 12/2003 | Leader et al. |
| 6,718,392 B1 | 4/2004 | Krause |
| 6,728,743 B2 | 4/2004 | Shachar |
| 6,735,642 B2 | 5/2004 | Kagan et al. |
| 6,768,996 B1 | 7/2004 | Steffens et al. |
| 6,799,200 B1 | 9/2004 | Blackmore et al. |
| 6,904,534 B2 | 6/2005 | Koenen |
| 6,950,961 B2 | 9/2005 | Krause et al. |
| 6,978,331 B1 | 12/2005 | Kagan et al. |
| 7,093,158 B2 | 8/2006 | Barron et al. |
| 7,099,275 B2 | 8/2006 | Sarkinen et al. |
| 7,103,626 B1 | 9/2006 | Recio et al. |
| 7,103,744 B2 | 9/2006 | Garcia et al. |
| 7,136,397 B2 | 11/2006 | Sharma |
| 7,143,412 B2 | 11/2006 | Koenen |
| 7,149,227 B2 | 12/2006 | Stoler et al. |
| 7,151,744 B2 | 12/2006 | Sarkinen et al. |
| 7,216,225 B2 | 5/2007 | Haviv et al. |
| 7,240,350 B1 | 7/2007 | Eberhard et al. |
| 7,245,627 B2 | 7/2007 | Goldenberg et al. |
| 7,254,237 B1 | 8/2007 | Jacobson et al. |
| 7,285,996 B2 | 10/2007 | Fiedler |
| 7,316,017 B1 | 1/2008 | Jacobson et al. |
| 7,346,702 B2 | 3/2008 | Haviv |
| 7,386,619 B1 | 6/2008 | Jacobson et al. |
| 7,403,535 B2 | 7/2008 | Modi et al. |
| 7,404,190 B2 | 7/2008 | Krause et al. |
| 7,451,456 B2 * | 11/2008 | Andjelic ....................... 719/321 |
| 7,502,826 B2 | 3/2009 | Barron et al. |
| 7,509,355 B2 | 3/2009 | Hanes et al. |
| 7,518,164 B2 | 4/2009 | Smelloy et al. |
| 7,551,614 B2 | 6/2009 | Teisberg et al. |
| 7,554,993 B2 | 6/2009 | Modi et al. |
| 7,555,566 B2 * | 6/2009 | Blumrich et al. ............. 709/249 |
| 7,573,967 B2 | 8/2009 | Fiedler |
| 7,580,415 B2 | 8/2009 | Hudson et al. |
| 7,580,495 B2 | 8/2009 | Fiedler |
| 7,617,376 B2 | 11/2009 | Chadalapaka et al. |
| 7,631,106 B2 | 12/2009 | Goldenberg et al. |
| 7,650,386 B2 | 1/2010 | McMahan et al. |
| 7,653,754 B2 | 1/2010 | Kagan et al. |
| 7,688,853 B2 | 3/2010 | Santiago et al. |
| 7,757,232 B2 | 7/2010 | Hilland et al. |
| 7,801,027 B2 | 9/2010 | Kagan et al. |
| 7,802,071 B2 | 9/2010 | Oved |
| 7,813,460 B2 | 10/2010 | Fiedler |
| 7,827,442 B2 | 11/2010 | Sharma et al. |
| 7,835,375 B2 | 11/2010 | Sarkinen et al. |
| 7,848,322 B2 | 12/2010 | Oved |
| 7,856,488 B2 | 12/2010 | Cripe et al. |
| 7,864,787 B2 | 1/2011 | Oved |
| 7,904,576 B2 | 3/2011 | Krause et al. |
| 7,921,178 B2 | 4/2011 | Haviv |
| 7,929,539 B2 | 4/2011 | Kagan et al. |
| 7,930,437 B2 | 4/2011 | Kagan et al. |
| 7,934,959 B2 | 5/2011 | Rephaeli et al. |
| 7,978,606 B2 | 7/2011 | Buskirk et al. |
| 8,000,336 B2 | 8/2011 | Harel |
| 2002/0016914 A1 | 2/2002 | Seki et al. |
| 2002/0026502 A1 * | 2/2002 | Phillips et al. ................. 709/219 |
| 2002/0059052 A1 | 5/2002 | Bloch et al. |
| 2002/0091863 A1 | 7/2002 | Schug |
| 2002/0112139 A1 | 8/2002 | Krause et al. |
| 2002/0124108 A1 | 9/2002 | Terrell et al. ................. 709/245 |
| 2002/0129293 A1 | 9/2002 | Hutton et al. |
| 2002/0140985 A1 | 10/2002 | Hudson |
| 2002/0156784 A1 | 10/2002 | Hanes et al. |
| 2003/0007165 A1 | 1/2003 | Hudson |
| 2003/0058459 A1 | 3/2003 | Wu et al. |
| 2003/0063299 A1 | 4/2003 | Cowan et al. |
| 2003/0065856 A1 * | 4/2003 | Kagan et al. ................. 710/263 |
| 2003/0081060 A1 | 5/2003 | Zeng et al. |
| 2003/0172330 A1 | 9/2003 | Barron et al. |
| 2003/0191786 A1 | 10/2003 | Matson et al. |
| 2003/0202043 A1 | 10/2003 | Zeng et al. |
| 2003/0214677 A1 | 11/2003 | Bhaskar et al. |
| 2004/0024833 A1 | 2/2004 | Siddabathuni |
| 2004/0071250 A1 | 4/2004 | Bunton et al. |
| 2004/0141642 A1 | 7/2004 | Zeng et al. |
| 2004/0190533 A1 | 9/2004 | Modi et al. |
| 2004/0190538 A1 | 9/2004 | Bunton et al. |
| 2004/0190557 A1 | 9/2004 | Barron |
| 2004/0193734 A1 | 9/2004 | Barron et al. |
| 2004/0193825 A1 | 9/2004 | Garcia et al. |
| 2004/0210754 A1 | 10/2004 | Barron et al. |
| 2004/0252685 A1 | 12/2004 | Kagan et al. |
| 2005/0008223 A1 | 1/2005 | Zeng et al. |
| 2005/0018221 A1 | 1/2005 | Zeng et al. |
| 2005/0038918 A1 | 2/2005 | Hilland et al. |
| 2005/0038941 A1 | 2/2005 | Chadalapaka et al. |
| 2005/0039171 A1 | 2/2005 | Avakian et al. |
| 2005/0039172 A1 | 2/2005 | Rees et al. |
| 2005/0039187 A1 | 2/2005 | Avakian et al. |
| 2005/0066333 A1 | 3/2005 | Krause et al. |
| 2005/0172181 A1 | 8/2005 | Huliehel |
| 2005/0219278 A1 | 10/2005 | Hudson |
| 2005/0219314 A1 | 10/2005 | Donovan et al. |
| 2005/0231751 A1 | 10/2005 | Wu et al. |
| 2006/0026443 A1 | 2/2006 | McMahan et al. |
| 2006/0045098 A1 | 3/2006 | Krause |
| 2006/0126619 A1 | 6/2006 | Teisberg et al. |
| 2006/0165074 A1 | 7/2006 | Modi et al. |
| 2006/0193318 A1 | 8/2006 | Narasimhan et al. |
| 2006/0228637 A1 | 10/2006 | Jackson et al. |
| 2006/0248191 A1 | 11/2006 | Hudson et al. |
| 2007/0188351 A1 | 8/2007 | Brown et al. |
| 2007/0220183 A1 | 9/2007 | Kagan et al. |
| 2008/0024586 A1 | 1/2008 | Barron |
| 2008/0109526 A1 | 5/2008 | Subramanian et al. |
| 2008/0115216 A1 | 5/2008 | Barron et al. |
| 2008/0115217 A1 | 5/2008 | Barron et al. |
| 2008/0126509 A1 | 5/2008 | Subramanian et al. |
| 2008/0135774 A1 | 6/2008 | Hugers |
| 2008/0147828 A1 | 6/2008 | Enstone et al. |
| 2008/0148400 A1 | 6/2008 | Barron et al. |
| 2008/0177890 A1 | 7/2008 | Krause et al. |
| 2008/0244060 A1 | 10/2008 | Cripe et al. |
| 2008/0301406 A1 | 12/2008 | Jacobson et al. |
| 2008/0304519 A1 | 12/2008 | Koenen et al. |
| 2009/0165003 A1 | 6/2009 | Jacobson et al. |
| 2009/0201926 A1 | 8/2009 | Kagan et al. |
| 2009/0213856 A1 | 8/2009 | Paatela et al. |
| 2009/0268612 A1 | 10/2009 | Felderman et al. |
| 2009/0302923 A1 | 12/2009 | Smeloy et al. |
| 2010/0088437 A1 | 4/2010 | Zahavi |
| 2010/0138840 A1 | 6/2010 | Kagan et al. |
| 2010/0169880 A1 | 7/2010 | Haviv et al. |
| 2010/0188140 A1 | 7/2010 | Smeloy |
| 2010/0189206 A1 | 7/2010 | Kagan |
| 2010/0265849 A1 | 10/2010 | Harel |
| 2010/0274876 A1 | 10/2010 | Kagan et al. |
| 2011/0004457 A1 | 1/2011 | Haviv et al. |
| 2011/0010557 A1 | 1/2011 | Kagan et al. |
| 2011/0029669 A1 | 2/2011 | Chuang et al. |
| 2011/0029847 A1 | 2/2011 | Goldenberg et al. |
| 2011/0044344 A1 | 2/2011 | Hudson et al. |
| 2011/0058571 A1 | 3/2011 | Bloch et al. |
| 2011/0083064 A1 | 4/2011 | Kagan et al. |
| 2011/0096668 A1 | 4/2011 | Bloch et al. |

(56) References Cited

U.S. PATENT DOCUMENTS

| | | | |
|---|---|---|---|
| 2011/0113083 | A1 | 5/2011 | Shahar |
| 2011/0116512 | A1 | 5/2011 | Crupnicoff et al. |
| 2011/0119673 | A1 | 5/2011 | Bloch et al. |
| 2011/0173352 | A1 | 7/2011 | Sela et al. |

FOREIGN PATENT DOCUMENTS

| | | |
|---|---|---|
| WO | WO 00/67131 A2 | 11/2000 |
| WO | WO 00/67131 A3 | 11/2000 |
| WO | WO0148972 | 7/2001 |
| WO | WO0235838 | 5/2002 |
| WO | WO2008127672 | 10/2008 |
| WO | WO2009134219 | 11/2009 |
| WO | WO2009136933 | 11/2009 |
| WO | WO2010020907 | 2/2010 |
| WO | WO2010087826 | 8/2010 |
| WO | WO2011043768 | 4/2011 |
| WO | WO2011053305 | 5/2011 |
| WO | WO2011053330 | 5/2011 |

OTHER PUBLICATIONS

Proceedings of the 13th International Conference on Supercomputing paper 'Realizing the Performance Potential of the Virtual Interface Architecture' (Jun. 1999).*
Technical Specification 'Virtual Interface Architecture Specification Version 1.0' (Dec. 16, 1997) to Compaq et al. ("Compaq").*
Bhoedjang, R.A.F.; Ruhl, T.; Bal, H.E.;, "Efficient multicast on Myrinet using link-level flow control," Parallel Processing, 1998. Proceedings. 1998 International Conference on, vol., No., pp. 381-390, Aug. 10-14, 1998 doi: 10.1109/ICPP.1998.708509.*
Massimo Bertozzi, Franco Boselli, Gianni Conte, and Monica Reggiani. 1999. An MPI Implementation on the Top of the Virtual Interface Architecture. In Proceedings of the 6th European PVM/MPI Users' Group Meeting on Recent Advances IN PVM/MPI, Jack Dongarra, Emilio Luque, and Tomàs Margalef (Eds.). Springer-Verlag, London, UK, UK, 199-206.*
P. Druschel, *Operating System Support for High-Speed Communication: Techniques to Eliminate Processing Bottlenecks in High-Speed Networking are Presented*, Communication of the ACM, Sep. 1996, pgs. 41-51, vol. 39(9), XP000642200.
P. Druschel et al., *Lazy Receiver Processing (LRP): A Network Subsystem Architecture for Server Systems*, Operating Systems Review (SIGOPS), Dec. 1996, pp. 261-275, vol. 30, XP000643517.
S. Mukherjee et al., *A Survey of User-Level Network Interfaces for System Area Networks*, University of Wisconsin-Madison, Technical Report #1340, Feb. 1997, pp. 1-26, XP002302774.
I. Pratt et al., *Arsenic: A User-Accessible Gigabit Ethernet Interface*, IEEE INFOCOM, Apr. 2001, pp. 67-76, vol. 1, Conf. 20, XP10538686.
D. Riddoch et al., *A Low Overhead Application/Device-driver Interface for User-level, Networking*, International Conference on Parallel and Distributed Processing Techniques and Applications, Jun. 2001, pp. 1-7, XP002302772.
D. Riddoch et al., *Tripwire: A Synchronisation of Primitive for Virtual Memory Mapped Communication*, Journal of Interconnection Networks (JOIN), Sep. 2001, pp. 345-364, vol. 2(3), XP002302773.
Gordon E. Moore, Cramming more components onto integrated circuits, Electronics, vol. 38, No. 8, pp. 114-117, Apr. 19, 1965.
Jack B. Dennis and Earl C. Van Horn, Programming Semantics for Multiprogrammed Computations, Communications of the ACM, vol. 9, No. 3, pp. 143-155, Mar. 1966.
Marvin Zelkowitz, Interrupt Driven Programming, Communications of the ACM, vol. 14, No. 6, p. 417-418, Jun. 1971.
J. Carver Hill, Synchronizing Processors with Memory-Content-Generated Interrupts, Communications of the ACM, vol. 16, No. 6, p. 350-351, Jun. 1973.
F.F. Kuo, The Aloha System, ACM Computer Communication Review, vol. 4 No. 1, Jan. 1974.

Vinton Cerf, Robert Kahn, A Protocol for Packet Network Intercommunication, IEEE Transactions on Communications, vol. COM-22, No. 5, pp. 637-648, May 1974.
V. Cerf, et al., Proposal for an International End-to-End Protocol, ACM Computer Communication Review, vol. 6 No. 1, p. 1-18, Jan. 1976.
Robert M. Metcalfe and David R. Boggs, Ethernet: distributed packet switching for local computer networks, Communications of the ACM, vol. 19, Issue 7, pp. 395-404, Jul. 1976.
P. Kermani and L. Kleinrock, Virtual cut-through: A new computer communciation switching technique, Computer Networks, vol. 3, No. 4, pp. 267-286, Sep. 1979.
John M. McQuillan, et al., An Overview of the New Routing Algorithm for the ARPANET, Proceedings of the 6th Data Communications Symposium, p. 63, Nov. 1979.
Andrew D. Birrell, et al., Grapevine: An Exercise in Distributed Computing, Communications of the ACM, vol. 25, Issue 4, pp. 260-274, Apr. 1982.
Ian M. Leslie, et al., The Architecture of the Universe Network, ACM Computer Communication Review, vol. 14, No. 2, pp. 2-9, Jun. 1984.
John Nagle, Congestion Control in IP/TCP Internetworks, ACM Computer Communication Review, vol. 14, No. 4, p. 11-17, Oct. 1984.
Robert M. Brandriff, et al., Development of a TCP/IP for the IBM/370, ACM Computer Communication Review, vol. 15, No. 4, Sep. 1985.
C. Kline, Supercomputers on the Internet: A Case Study, ACM Computer Communication Review, vol. 17, No. 5, Aug. 1987.
Christopher A. Kent, Jeffrey C. Mogul, Fragmentation Considered Harmful, ACM Computer Communication Review, vol. 17, No. 5, pp. 390-401, Oct. 1987.
Gary S. Delp, et al., An Analysis of Memnet: An Experiment in High-Speed Shared-Memory Local Networking, ACM Computer Communication Review, vol. 18, No. 4, p. 165-174, Aug. 1988.
David R. Boggs, et al., Measured Capacity of an Ethernet: Myths and Reality, Computer Communication Review, vol. 18, No. 4, p. 222-234, Aug. 1988.
H. Kanakia and D. Cheriton, The VMP Network Adapter Board (NAB): High-Performance Network Communication for Multiprocessors, ACM Computer Communication Review, vol. 18, No. 4, p. 175-187, Aug. 1988.
V. Jacobson, Congestion Avoidance and Control, ACM Computer Communication Review, vol. 18, No. 4, p. 314-329, Aug. 1988.
David D. Clark, The Design Philosophy of the DARPA Internet Protocols, ACM Computer Communication Review, vol. 18, No. 4, pp. 106-114, Aug. 1988.
Paul V. Mockapetris, Kevin J. Dunlap, Development of the Domain Name System, ACM Computer Communication Review, vol. 18, No. 4, pp. 123-133, Aug. 1988.
Margaret L. Simmons and Harvey J. Wasserman, Performance Comparison of the Cray-2 and Cray X-MP/416 Supercomputers, Proceedings of the 1988 ACM/IEEE conference on Supercomputing, p. 288-295, Orlando, Florida, Nov. 12, 1988.
David A. Borman, Implementing TCP/IP on a Cray computer, ACM Computer, Communication Review, vol. 19, No. 2, p. 11-15, Apr. 1989.
R. Braden, et al., Computing the Internet Checksum, ACM Computer Communication Review, vol. 19, No. 2, p. 86-94, Apr. 1989.
David D. Clark, et al., An Analysis of TCP Processing Overhead, IEEE Communications Magazine, vol. 27, No. 6, pp. 23-29, Jun. 1989.
David R. Cheriton, Sirpent: A High-Performance Internetworking Approach, ACM Computer Communication Review, vol. 19, No. 4, p. 158-169, Sep. 1989.
Derek Robert McAuley, Protocol Design for High Speed Networks, PhD Thesis, University of Cambridge, Sep. 1989.
Craig Partridge, How Slow Is One Gigabit Per Second ?, ACM Computer Communication Review, vol. 20, No. 1, p. 44-53, Jan. 1990.
D. D. Clark and D. L., Tennenhouse, Architectural Considerations for a New Generation of Protocols, ACM Computer Communication Review, vol. 20, No. 4, pp. 200-208, Sep. 1990.

(56) References Cited

OTHER PUBLICATIONS

Eric C. Cooper, et al., Protocol Implementation on the Nectar Communication Processor, ACM Computer Communication Review, vol. 20, No. 4, p. 135-144, Sep. 1990.
Bruce S. Davie, A Host-Network Interface Architecture for ATM, ACM Computer Communication Review, vol. 21, No. 4, Sep. 1991.
C. Brendan S. Traw, et al., A High-Performance Host Interface for ATM Networks, ACM Computer Communication Review, vol. 21, No. 4, p. 317-325, Sep. 1991.
Ian Leslie and Derek R. McAuley, Fairisle: An ATM Network for the Local Area, ACM Computer Communication Review, vol. 21, No. 4, p. 327, Sep. 1991.
Mark Hayter, Derek McAuley, The Desk Area Network, ACM Operating Systems Review, vol. 25, Issue 4, p. 14-21, Oct. 1991.
Gregory G. Finn, An Integration of Network Communication with Workstation Architecture, ACM Computer Communication Review, vol. 21, No. 5, p. 18-29, Oct. 1991.
Greg Chesson, The Evolution of XTP, Proceedings of the Third International Conference on High Speed Networking, Nov. 1991.
Michael J. Dixon, System support for multi-service traffic, University of Cambridge Computer Laboratory Technical Report No. 245, Jan. 1992.
Danny Cohen, Gregory Finn, Robert Felderman, Annette DeSchon, ATOMIC: A Local Communication Network Created Through Repeated Application of Multicomputing Components, Made available by authors, Jan. 10, 1992.
Gene Tsudik, Message Authentication with One-Way Hash Functions, ACM Computer Communication Review, vol. 22, No. 5, pp. 29-38, Oct. 1992.
Peter Steenkiste, Analyzing Communication Latency using the Nectar Communication Processor, ACM Computer Communication Review, vol. 22, No. 4, Oct. 1992.
Paul E. McKenney and Ken F. Dove, Efficient Demultiplexing of Incoming TCP Packets, ACM Computer Communication Review, vol. 22, No. 4, Oct. 1992.
Erich Ruetsche and Matthias Kaiserswerth, TCP/IP on the Parallel Protocol Engine, Proceedings of the IFIP TC6NVG6.4 Fourth International Conference on High Performance Networking IV, Dec. 14, 1992.
C. Traw and J. Smith, Hardware/Software organization of a high performance ATM host interface, IEEE Journal on Selected Areas in Communications, pp. 240-253, Feb. 1993.
E. Ruetsche, The Architecture of Gb/s Multimedia Protocol Adapter, ACM Computer Communication Review, vol. 23, No. 3, Jul. 1993.
Jonathan M. Smith and C. Brendan S. Traw, Giving Applications Access to Gb/s Networking IEEE Network, vol. 7, Issue 4, pp. 44-52, Jul. 1993.
Jeffrey R. Michel, The Design and Evaluation of an Off-Host Communications Protocol Architecture, MSci Thesis, University of Virginia, Aug. 1993.
Mark David Hayter, A Workstation Architecture to Support Multimedia, PhD Thesis, University of Cambridge, Sep. 1993.
Jonathan Kay and Joseph Pasquale, The Importance of Non-Data Touching Processing Overheads in TCP/IP, ACM Computer Communication Review, vol. 23, No. 4, pp. 259-268, Oct. 1993.
W. E. Leland, et al., On the Self-Similar Nature of Ethernet Traffic, ACM Computer Communication Review, vol. 23, No. 4, p. 85-95, Oct. 1993.
C. A. Thekkath, et al., Implementing Network Protocols at User Level, ACM Computer Communication Review, vol. 23, No. 4, Oct. 1993.
Raj K. Singh, et al., A Programmable HIPPI Interface for a Graphics Supercomputer, Proceedings of the 1993 ACM/IEEE conference on Supercomputing, p. 452-461, Portland, Oregon, Nov. 15, 1993.
Peter Druschel and Larry L. Peterson, Fbufs: A High-Bandwidth Cross-Domain Transfer Facility, ACM Operating Systems Review, vol. 27, Issue 5, p. 189-202, Dec. 1993.
Matthias Kaiserswerth, The Parallel Protocol Engine, IEEE/ACM Transactions on Networking, vol. 1, No. 6, p. 650-663, Dec. 1993.
Chris Maeda, Brian Bershad, Protocol Service Decomposition for High-Performance Networking, ACM Operating Systems Review, vol. 27, Issue 5,p. 244-255, Dec. 1993.
Greg Regnier, et al., ETA: Experience with an Intel Xeon Processor as a Packet Processing Engine, IEEE Micro, vol. 24, No. 1, p. 24-31, Jan. 1994.
J. Vis, A Simple LAN Performance Measure, ACM Computer Communication Review, vol. 24, No. 1, pp. 7-11, Jan. 1994.
Danny Cohen, Gregory Finn, Robert Felderman, Annette DeSchon, ATOMIC: A High-Speed Local Communication Architecture, Journal of High Speed Networks, Jan. 3, 1994.
Gregory G. Finn and Paul Mockapetris, Netstation Architecture Multi-Gigabit Workstation Network Fabric, Proceedings of InterOp '94, Las Vegas, Nevada, May 1994.
Stuart Wray, et al., The Medusa Applications Environment, Proceedings of the International Conference on Multimedia Computing and Systems, p. 265-273, Boston, May 1994.
Various forum members, MPI: A Message-Passing Interface Standard, Message-Passing Interface Forum, University of Tennessee, Knoxville, May 5, 1994.
Raj K. Singh, et al., A Programmable Network Interface for a Message-Based Multicomputer, ACM Computer Communication Review, vol. 24, No. 3, p. 8-17, Jul. 1994.
P. Druschel, et al., Experiences with a High-Speed Network Adaptor: A Software Perspective, ACM Computer Communication Review, vol. 24, No. 4, Oct. 1994.
Sally Floyd, TCP and Explicit Congestion Notification, ACM Computer Communication Review, vol. 24, No. 5, p. 8-23, Oct. 1994.
A. Edwards, et al., User-Space Protocols Deliver High Performance to Applications on a Low-Cost Gb/s LAN, ACM Computer Communication Review, vol. 24, No. 4, pp. 14-23, Oct. 1994.
L. S. Brakmo, et al., TCP Vegas: New Techniques for Congestion Detection and Avoidance, ACM Computer Communication Review, vol. 24, No. 4, p. 24-35, Oct. 1994.
A. Romanow and S. Floyd, The Dynamics of TCP Traffic over ATM Networks, ACM Computer Communication Review, vol. 24, No. 4, p. 79-88, Oct. 1994.
R. J. Black, I. Leslie, and D. McAuley, Experiences of Building an ATM Switch for the Local Area, ACM Computer Communication Review, vol. 24, No. 4, p. 158-167, Oct. 1994.
Babak Falsafi, et al., Application-Specific Protocols for User-Level Shared Memory, Proceedings of the 1994 conference on Supercomputing, pp. 380-389, Washington D.C., Nov. 14, 1994.
Mengjou Lin, et al., Performance of High-Speed Network I/O Subsystems: Case Study of a Fibre Channel Network, Proceedings of the 1994 conference on Supercomputing, Washington D.C., Nov. 14, 1994.
Nanette J. Boden, et al., Myrinet: A Gigabit-per-Second Local-Area Network, Draft of paper published in IEEE Micro, vol. 15, No. 1, pp. 29-36, Nov. 16, 1994.
Thomas Sterling, et al., Beowolf: A Parallel Workstation for Scientific Computation, Proceedings of the 24th International Conference on Parallel Processing, pp. 11-14, Aug. 1995.
K. Kleinpaste, P. Steenkiste, B. Zill, Software Support for Outboard Buffering and Checksumming, ACM Computer Communication Review, vol. 25, No. 4, p. 87-98, Oct. 1995.
C. Partridge, J. Hughes, J. Stone, Performance of Checksums and CRCS over Real Data, ACM Computer Communication Review, vol. 25, No. 4, p. 68-76, Oct. 1995.
A. Edwards, S. Muir, Experiences Implementing a High-Performance TCP in User-Space, ACM Computer Communication Review, vol. 25, No. 4, Oct. 1995.
J. C. Mogul, The Case for Persistent-Connection HTTP, ACM Computer Communication Review, vol. 25, No. 4, Oct. 1995.
Thorsten von Eicken, et al., U-Net: A User-Level Network Interface for Parallel and Distributed Computing, ACM Operating Systems Review, vol. 29, Issue 5, p. 109-126, Dec. 1995.
D. L. Tennenhouse, D. J., Wetherell Towards an Active Network Architecture, ACM Computer Communication Review, vol. 26, No. 2, pp. 15-20, Apr. 1996.
Paul Ronald Barham, Devices in a Multi-Service Operating System, PhD Thesis, University of Cambridge, Jul. 1996.

(56) References Cited

OTHER PUBLICATIONS

Chi-Chao Chang, et al., Low-Latency Communication on the IBM RISC System/6000 SP, Proceedings of the 1996 ACM/IEEE conference on Supercomputing, Pittsburgh, Nov. 17, 1996.
Joe Touch, et al., Experiences with a Production Gigabit LAN, Gigabit Networking Workshop '97 Meeting, Kobe, Japan, Apr. 1997.
Joe Touch, et al., Host-based Routing Using Peer DMA, Gigabit Networking Workshop '97 Meeting, Kobe, Japan, Apr. 1997.
O. Angin, et al., Report on the 5th IFIP International Workshop on Quality of Service (IWQOS 97), ACM Computer Communication Review, vol. 27, No. 3, pp. 100-117, Jul. 1997.
Charles P. Thacker and Lawrence C. Stewart, Firefly: a Multiprocessor Workstation, ACM Operating Systems Review, vol. 21, Issue 4, p. 164-172, Oct. 1997.
Ed Anderson, et al., Performance of the CRAY T3E Multiprocessor, Proceedings of the 1997 ACM/IEEE conference on Supercomputing, p. 1-17, San Jose, California, Nov. 16, 1997.
Harvey J. Wassermann, et al., Performance Evaluation of the SGI Origin2000: A Memory-Centric Characterization of LANL ASCI Applications, Proceedings of the 1997 ACM/IEEE conference on Supercomputing, p. 1-11, San Jose, California, Nov. 16, 1997.
Philip Buonadonna, et al., An Implementation and Analysis of the Virtual Interface Architecture, Proceedings of the 1998 ACM/IEEE conference on Supercomputing, p. 1-15, Orlando, Florida, Nov. 7, 1998.
Parry Husbands and James C. Hoe, MPI-StarT: Delivering Network Performance to Numerical Applications, Proceedings of the 1998 ACM/IEEE conference on Supercomputing, p. 1-15, Orlando, Florida, Nov. 7, 1998.
Michael S. Warren, at al., Avalon: An Alpha/Linux Cluster Achieves 10 Gflops for $150k, Proceedings of the 1998 ACM/IEEE conference on Supercomputing, Orlando, Florida, Nov. 7, 1998.
John Salmon, et al., Scaling of Beowulf—class Distributed Systems, Proceedings of the 1998 ACM/IEEE conference on Supercomputing, Orlando, Florida, Nov. 7, 1998.
Boon S. Ang, et al. StarT-Voyager: A Flexible Platform for Exploring Scalable SMP Issues, Proceedings of the 1998 ACM/IEEE conference on Supercomputing, Orlando, Florida, Nov. 7, 1998.
S. L. Pope, et al., Enhancing Distributed Systems with Low-Latency Networking, Parallel and Distributed Computing and Networks, Brisbane, Australia, Dec. 1998.
M. de Vivo, at al., Internet Vulnerabilities Related to TCP/IP and T/TCP, ACM Computer Communication Review, vol. 29, No. 1, pp. 81-85, Jan. 1999.
M. Allman, TCP Byte Counting Refinements, ACM Computer Communication Review, vol. 29, No. 3, Jul. 1999.
Steve Muir and Jonathan Smith, Piglet: A Low-Intrusion Vertical Operating System, Technical Report MS-CIS-00-04, University of Pennsylvania, Jan. 2000.
Patrick Crowley, et al., Characterizing Processor Architectures for Programmable Network Interfaces, Proceedings of the 14th international conference on Supercomputing, pp. 54-65, Santa Fe, New Mexico, May 8, 2000.
Jonathan Stone, Craig Partridge, When The CRC and TCP Checksum Disagree, ACM Computer Communication Review, vol. 30, No. 4, pp. 309-319, Oct. 2000.
W. Feng and P. Tinnakornsrisuphap, The Failure of TCP in High-Performance Computational Grids, Proceedings of the 2000 ACM/IEEE conference on Supercomputing, Dallas, Texas, Nov. 4, 2000.
Jenwei Hsieh, et al., Architectural and Performance Evaluation of GigaNet and Myrinet Interconnects on Clusters of Small-Scale SMP Servers, Proceedings of the 2000 ACM/IEEE conference on Supercomputing, Dallas, Texas, Nov. 4, 2000.
Ian Pratt and Keir Fraser, Arsenic: A User-Accessible Gigabit Ethernet Interface, Proceedings of IEEE Infocom 2001, pp. 67-76, Apr. 22, 2001.
Bilic Hrvoye, et al., Deferred Segmentation for Wire-Speed Transmission of Large TCP Frames over Standard GbE Networks, Proceedings of the 9th Symposium on High Performance Interconnects, pp. 81, Aug. 22, 2001.
Bilic Hrvoye, et al., Presentation given at HOTI'01, 9th Symposium on High Performance Interconnects, Aug. 22, 2001.
Bruce Lowekamp, et al., Topology Discovery for Large Ethernet Networks, ACM Computer Communication Review, vol. 31, No. 4, Oct. 2001.
Piyush Shivam, et al., EMP: Zero-copy OS-bypass NIC-driven Gigabit Ethernet Message Passing, Proceedings of the 2001 ACM/IEEE conference on Supercomputing, pp. 57, Denver, Nov. 10, 2001.
Robert Ross, et al., A Case Study in Application I/O on Linux Clusters, Proceedings of the 2001 ACM/IEEE conference on Supercomputing, pp. 11, Denver, Nov. 10, 2001.
E. Blanton and M. Allman, On Making TCP More Robust to Packet Reordering, ACM Computer Communication Review, vol. 32 No. 1, Jan. 2002.
Murali Rangarajan, et al., TCP Servers: Offloading TCP Processing in Internet Servers. Design, Implementation, and Performance, Technical Report DCR-TR-481, Computer Science Department, Rutgers University, Mar. 2002.
Jon Crowcroft, Derek McAuley, ATM: A Retrospective on Systems Legacy, ACM Computer Communication Review, vol. 32, No. 5, Nov. 2002.
Charles Kalmanek, A Retrospective View of ATM, ACM Computer Communication Review, vol. 32, No. 5, pp. 13-19, Nov. 2002.
Jonathan Smith, The Influence of ATM on Operating Systems, ACM Computer Communication Review, vol. 32, No. 5, pp. 29-37, Nov. 2002.
NR Adiga, et al., An Overview of the BlueGene/L Supercomputer, Proceedings of the 2002 ACM/IEEE conference on Supercomputing, pp. 1-22, Baltimore, Nov. 16, 2002.
Steven J. Sistare, Christopher J. Jackson, Ultra-High Performance Communication with MPI and the Sun Fire Link Interconnect, Proceedings of the 2002 ACM/IEEE conference on Supercomputing, p. 1-15, Baltimore, Nov. 16, 2002.
R. Bush, D. Meyer, Some Internet Architectural Guidelines and Philosophy, IETF Network Working Group, Request for Comments: 3439, Dec. 2002.
Pasi Sarolahti, et al., F-RTO: An Enhanced Recovery Algorithm for TCP Retransmission Timeouts, ACM Computer Communication Review, vol. 33, No. 2, Apr. 2003.
Tom Kelly, Scalable TCP: Improving Performance in Highspeed Wide Area Networks, ACM Computer Communication Review, vol. 33, No. 2, pp. 83-91, Apr. 2003.
Jeffrey C. Mogul, TCP offload is a dumb idea whose time has come, Proceedings of HotOS IX: The 9th Workshop on Hot Topics in Operating Systems, pp. 25-30, May 18, 2003.
Derek McAuley, Rolf Neugebauer, A case for Virtual Channel Processors, Proceedings of the ACM SIGCOMM 2003 Workshops, Aug. 2003.
Justin Hurwitz, Wu-chun Feng, Initial End-to-End Performance Evaluation of 10-Gigabit Ethernet, Proceedings of the 11th Symposium on High Performance Interconnects, Aug. 20, 2003.
Vinay Aggarwal, et al., Workshop on network-I/O convergence: experience, lessons, implications (NICELI), ACM Computer Communication Review, vol. 33, No. 5, Oct. 2003.
Wu-chun Feng, et al., Optimizing 10-Gigabit Ethernet for Networks of Workstations, Clusters, and Grids: A Case Study, Proceedings of the 2003 ACM/IEEE conference on Supercomputing, Phoenix, Arizona, Nov. 15, 2003.
Jiuxing Liu, et al., Performance Comparison of MPI Implementations over InfiniBand, Myrinet and Quadric, Proceedings of the 2003 ACM/IEEE conference on Supercomputing, Phoenix, Arizona, Nov. 15, 2003.
Srihari Makineni and Ravi Iyer, Architectural Characterization of TCP/IP Packet Processing on the Pentium M Processor, Proceedings of the 10th International Symposium on High Performance Computer Architecture, pp. 152, Feb. 14, 2004.
Cheng Jin, et al., FAST TCP: Motivation, Architecture, Algorithms, Performance, Proceedings of IEEE Infocom 2004, pp. 1246-1259, Mar. 7, 2004.
Andy Currid, TCP Offload to the Rescue, ACM Queue, vol. 2, No. 3, May 1, 2004.
Greg Regnier, et al., TCP Onloading for Data Center Servers, Computer, IEEE Computer Society, vol. 37, No. 11, pp. 48-58, Nov. 2004.

(56) References Cited

OTHER PUBLICATIONS

Gregory L. Chesson, Declaration of Dr Gregory L Chesson in *Alacritech v. Microsoft* United States District Court, Northern District California, San Francisco Division, Feb. 4, 2005.

Edward D. Lazowska, David A. Patterson, Computing Research: A Looming Crisis, ACM Computer Communication Review, vol. 35, No. 2, Jul. 2005.

W. Feng, et al., Performance Characterization of a 10-Gigabit Ethernet TOE, Proceedings of the 13th Symposium on High Performance Interconnects, Aug. 17, 2005.

B. Leslie, et al., User-level device drivers: Achieved performance, J. Comput. Sci. & Technol., vol. 20, Sep. 2005.

P. Balaji, et al., Head-to-TOE Evaluation of High-Performance Sockets Over Protocol Offload Engines, Proceedings of the IEEE International Conference on Cluster Computing, Sep. 2005.

Humaira Kamal, et al., SCTP versus TCP for MPI, Proceedings of the 2005 ACM/IEEE conference on Supercomputing, Seattle, p. 30, Washington, Nov. 12, 2005.

Sumitha Bhandarkar, et al., LTCP: Improving the Performance of TCP in Highspeed Networks, ACM Computer Communication Review, vol. 36, No. 1, pp. 41-50, Jan. 2006.

H. K. Jerry Chu, Zero-Copy TCP in Solaris, Proceedings of the USENIX Annual Technical Conference Jan. 1996.

Ken Calvert, Reflections on Network Architecture: an Active Networking Perspective, ACM Computer Communication Review, vol. 36, No. 2, pp. 27-30, Apr. 2006.

Jon Crowcroft, 10 Networking Papers: Recommended Reading, ACM Computer Communication Review, vol. 36, No. 2, pp. 51-52, Apr. 2006.

Greg Minshall, et al., Flow labelled IP over ATM: design and rationale, ACM Computer Communication Review, vol. 36, No. 3, pp. 79-92, Jul. 2006.

David Wetherall, 10 Networking Papers: Readings for Protocol Design, ACM Computer Communication Review, vol. 36, No. 3, pp. 77-78, Jul. 2006.

Patrick Geoffray, A Critique of RDMA, HPCWire article: http://www.hpcwire.com/features/17886984.html, Aug. 18, 2006.

Various, Various presentations given at HOTI'06, 14th Symposium on High Performance Interconnects, Aug. 23, 2006.

Jose Carlos Sancho, et al., Quantifying the Potential Benefit of Overlapping Communication and Computation in Large-Scale Scientific Applications, Proceedings of the 2006 ACM/IEEE conference on Supercomputing, Tampa, Florida, Nov. 11, 2006.

Sayantan Sur, et al., High-Performance and Scalable MPI over InfiniBand with Reduced Memory Usage: An In-Depth Performance Analysis, Proceedings of the 2006 ACM/IEEE conference on Supercomputing, Tampa, Florida, Nov. 11, 2006.

Steven Pope, David Riddoch, 10Gb/s Ethernet Performance and Retrospective, ACM Computer Communication Review, vol. 37, No. 2, pp. 89-92, Mar. 19, 2007.

Kieran Mansley, et al., Getting 10 Gb/s from Xen, Euro-Par Conference 2007, pp. 224-233, Rennes, France, Aug. 28, 2007.

M. Kaiserswerth, The Parallel Protocol Engine, IEEE/ACM Transactions in Networking, vol. 1, Issue 6, pp. 650-663, Dec. 1993.

Danny Cohen, et al., Use of message-based multicomputer components to construct gigabit networks, ACM Computer Communication Review, vol. 23, No. 4, p. 32-44, Jul. 1993.

J. Evans and T. Buller, The End of History, IEEE TCGN Gigabit Networking Workshop, Apr. 22, 2001.

M.V. Wilkes and R.M. Needham, The Cambridge Model Distributed System, ACM SIGOPS Operating Systems Review, vol. 14, Issue 1, pp. 21-29, Jan. 1980.

Petrini, F., Pacific Northwest National Laboratory, "Protocol Offloading vs. On-loading in High Performance Networks", $14^{th}$ Annual Symposium on High Performance Interconnects (HOTI '06), Aug. 2006, Stanford University, CA USA, 4 pp.

Mogul, J., "Thoughts about TCP offloading", $14^{th}$ Annual Symposium on High Performance Interconnects (HOTI '06), Aug. 2006, Stanford University, CA, USA, 3 pages.

Dickman, L., "Protocol Offloading vs Onloading in High Performance Networks", $14^{th}$ Annual Symposium on High Performance Interconnects (HOTI '06), Aug. 2006, Stanford University, CA, USA, 7 pp.

Geoffray, P., "Protocol off-loading vs on-loading in high-performance networks", $14^{th}$ Annual Symposium on High Performance Interconnects (HOTI '06), Aug. 2006, Stanford University, CA, USA, 5 pp.

Montry, G., "The NE010 iWARP Adapter", $14^{th}$ Annual Symposium on High Performance Interconnects (HOTI '06), Aug. 2006, Stanford University, CA, USA, 8 pp.

Regnier, G., "Protocol Onload vs. Offload", $14^{th}$ Annual Symposium on High Performance Interconnects (HOTI '06), Aug. 2006, Stanford University, CA, USA, 1 page.

Chen et al., "UTLB: A Mechanism for Address Translation on Network Interfaces", Proceedings of the Eighth International Conference on Architectural Support for Programming Languages and Operating Systems (ASPLOS). Oct. 1998, pp. 193-204.

Druschel et al., "Experiences with a High-Speed Network Adaptor: A Software Perspective", Proceedings of the SIGCOMM '94 Conference, pp. 2-13, London, UK, Aug. 1994.

Roberts et al., "Data Transfer, Synchronising Applications, and Low Latency Networks", International Publication No. WO 00/67131, Publication Date: Nov. 9, 2000.

Pfister, Gregory, "An Introduction to the InfiniBand Architecture," Part IX; Emerging Technologies and Future Trends, 2001, pp. 617-632, IEEE Press, NY.

Non-Final Office Action, U.S. Appl. No. 11/750,117, dated Sep. 8, 2008, 14 pages.

Final Office Action, U.S. Appl. No. 11/750,117, dated Jun. 10, 2009, 12 pages.

Non-Final Office Action, U.S. Appl. No. 11/750,117, dated Dec. 28, 2009, 14 pages.

Final Office Action, U.S. Appl. No. 11/750,117, dated Jul. 29, 2010, 13 pages.

\* cited by examiner

Fig. 11

Incoming apertures

| Aperture index | nonce | SEQ number | Type CI | Source Cluster Address | Source Ethernet Address | Size | Base of PCI address for aperture |
|---|---|---|---|---|---|---|---|
| Port | | SEQ number | Type CI Event | Source IP Address | Source Ethernet Address | | Pointer to descriptor For Event Queue |
| " | | " | Type IP | " | " | | Pointer to descriptor variable data queue |

Ethernet Packet ⟶ ⟶ PCI

NETWORK INTERFACE AND PROTOCOL

CROSS-REFERENCE TO RELATED APPLICATIONS

This application is a continuation of pending U.S. application Ser. No. 10/661,765, filed Sep. 15, 2003, which claims priority to Great Britain patent application No. 0221464.1, filed Sep. 16, 2002, and are incorporated herein by reference.

BACKGROUND OF THE INVENTION

1. Field of the Invention

This invention relates to a network interface and a protocol for use in passing data over a network.

2. Description of the Related Art

When data is to be transferred between two devices over a data channel, each of the devices must have a suitable network interface to allow it to communicate across the channel. The devices and their network interfaces use a protocol to form the data that is transmitted over the channel, so that it can be decoded at the receiver. The data channel may be considered to be or to form part of a network, and additional devices may be connected to the network.

The Ethernet system is used for many networking applications. Gigabit Ethernet is a high-speed version of the Ethernet protocol, which is especially suitable for links that require a large amount of bandwidth, such as links between servers or between data processors in the same or different enclosures. Devices that are to communicate over the Ethernet system are equipped with network interfaces that are capable of supporting the physical and logical requirements of the Ethernet system. The physical hardware component of network interfaces are referred to as network interface cards (NICs), although they need not be in the form of cards: for instance they could be in the form of integrated circuits (ICs) and connectors fitted directly on to a motherboard.

Where data is to be transferred between cooperating processors in a network, it is common to implement a memory mapped system. In a memory mapped system communication between the applications is achieved by virtue of a portion of one application's virtual address space being mapped over the network onto another application. The "holes" in the address space which form the mapping are termed apertures. FIG. 1 illustrates a mapping of the virtual address space $(X_o\text{-}X_n)$ onto another virtual address space $(Y_o\text{-}Y_n)$ via a network. In such a system a CPU that has access to the $X_o\text{-}X_n$ memory space could access a location $x_1$ for writing the contents of a register $r_1$ to that location by issuing the store instruction [st $r_1$, $x_1$]. A memory mapping unit (MMU) is employed to map the virtual memory onto physical memory location.

The following steps would then be taken:

1. CPU emits the contents of $r_1$ (say value 10) as a write operation to virtual address $x_1$
2. The MMU (which could be within the CPU) turns the virtual address $x_1$ into physical address $pci_1$ (this may include page table traversal or a page fault)
3. The CPU's write buffer emits the "write 10, $pci_1$" instruction which is "caught" by the controller for the bus on which the CPU is located, in this example a PCI (Input/Output bus subsystem) controller. The instruction is then forwarded onto the computer's PCI bus.
4. A NIC connected to the bus and interfacing to the network "catches" the PCI instruction and forwards the data to the destination computer at which virtual address space $(Y_o\text{-}Y_n)$ is hosted.
5. At the destination computer, which is assumed to have equivalent hardware, the network card emits a PCI write transaction to store the data in memory
6. The receiving application has a virtual memory mapping onto the memory and may read the data by executing a "load $Y_1$" instruction These steps are illustrated by FIG. 2. This figure illustrates that at each point that the hardware store instructions passes from one hardware device to another, a translation of the address from one address space to another may be required. Also note that a very similar chain of events supports read operations and PCI is assumed but not required as the host IO bus implementation.

Hence the overall memory space mapping $\{X_o\text{-}X_n\} \rightarrow \{Y_o\text{-}Y_n\}$ is implemented by a series of sub-mappings as follows:

$\{X_o\text{-}X_n\}$ $\rightarrow$ $\{PCI_o, PCI_n\}$ (processor 1 address space)

$\rightarrow$ $\{PCI'_o, PCI'_n\}$ (PCI bus address space)

$\rightarrow$

Network—mapping not shown $\rightarrow$ $\{PCI''_o\text{-}PCI''_n\}$ (destination PCI bus address space)

$\rightarrow$ $\{mem_o\text{-}mem_n\}$ (destination memory address space)

$\rightarrow$ $\{Y_o\text{-}Y_n\}$ (destination application's virtual address space)

The step marked in FIG. 2 as "Network" requires the NIC/network controller to forward the transaction to the correct destination host in such a way that the destination can continue the mapping chain. This is achieved by means of further memory apertures.

Two main reasons for the use of aperture mappings are:

a) System robustness. At each point that a mapping is made, hardware may check the validity of the address by matching against the valid aperture tables. This guards against malicious or malfunctioning devices. The amount of protection obtained is the ratio of the address space size (in bits) and the number of allocated apertures (total size in bits).

b) Conservation of address bits. Consider the case that a host within a 32 bit memory bus requires to access two 32 bit PCI buses. On the face of it, these would not be sufficient bits, since a minimum of 33 should be needed. However, the use of apertures enables a subset of both PCI buses to be accessed:

$\{PCI_o\text{-}PCI_n\} \rightarrow \{PCI'_o\text{-}PCI'_n\}$ and $\{PCI_p\text{-}PCI_q\} \rightarrow \{PCI''_p\text{-}PCI''_q\}$ Hardware address mappings and apertures are well understood in the area of virtual memory and I/O bus mapping (e.g. PCI). However there are difficulties in implementing mappings are required over a network. The main issues are:

1. A large number of apertures may be required to be managed, because one host must communicate with many others over the network.
2. In network situations it is normal, for security reasons, to treat each host as its own protection and administrative domain. As a result, when a connection between two address spaces is to be made over a network, not all the aperture mappings along the path can be set up by the initiating host. Instead a protocol must be devised which allows all the mappings within each protection domain to be set by the "owner" of the domain in such a way that an end-end connection is established.
3. For security reasons it is normal for hosts within a network to not entirely trust the others, and so the mapping scheme should allow arbitrary faulty or malicious hosts from corrupting another host's memory.

Traditionally (e.g. for Ethernet or ATM switching), protocol stacks and network drivers have resided in the kernel. This has been done to enable 1. the complexity of network hardware to be hidden via a higher level interface;
2. the safe multiplexing of network hardware and other system resources (such as memory) over many applications;
3. the security of the system against faulty or malicious applications.

In the operation of a typical kernel stack system a hardware network interface card interfaces between a network and the kernel. In the kernel a device driver layer communicates directly with the NIC, and a protocol layer communicates with the system's application level.

The NIC stores pointers to buffers for incoming data supplied to the kernel and outgoing data to be applied to the network. These are termed the Rx data ring and the Tx data ring. The NIC updates a buffer pointer indicating the next data on the Rx buffer ring to be read by the kernel. The Tx data ring is supplied by direct memory access (DMA) and the NIC updates a buffer pointer indicating the outgoing data which has been transmitted. The NIC can signal to the kernel using interrupts.

Incoming data is picked off the Rx data ring by the kernel and is processed in turn. Out of band data is usually processed by the kernel itself. Data that is to go to an application-specific port is added by pointer to a buffer queue, specific to that port, which resides in the kernel's private address space.

The following steps occur during operation of the system for data reception:

1. During system initialization the operating system device driver creates kernel buffers and initializes the Rx ring of the NIC to point to these buffers. The OS also is informed of its IP host address from configuration scripts.
2. An application wishes to receive network packets and creates a Port which is a queue-like data structure residing within the operating system. It has a number port which is unique to host in such a way that network packets addressed by <host:port> can be delivered to the port's queue.
3. A packet arrives at the network interface card (NIC). The NIC copies the packet over the host I/O bus (e.g. a PCI bus) to the memory address pointed to by the next valid Rx DMA ring Pointer value.
4. Either if there are no remaining DMA pointers available, or on a pre-specified timeout, the NIC asserts the I/O bus interrupt in order to notify the host that data has been delivered.
5. In response to the interrupt, the device driver examines the buffer delivered and if it contains valid address information, such as a valid host address, passes a pointer to the buffer to the appropriate protocol stack (e.g. TCP/IP).
6. The protocol stack determines whether a valid destination port exists and if so, performs network protocol processing (e.g. generate an acknowledgement for the received data) and enqueues the packet on the port's queue.
7. The OS may indicate to the application (e.g. by rescheduling and setting bits in a "select" bit mask) that a packet has arrived on the network end point to which the port is bound. (By marking the application as runnable and invoking a scheduler).
8. The application requests data from the OS, e.g. by performing a recv( ) system call (supplying the address and size of a buffer) and whilst in the OS kernel, data is copied from the kernel buffer into the application's buffer. On return from the system call, the application may access the data from the application buffer.
9. After the copy, the kernel will return the kernel buffer to an O/S pool of free memory. Also, during the interrupt the device driver allocates a new buffer and adds a pointer to the DMA ring. In this manner there is a circulation of buffers from the free pool to an application's port queue and back again.
10. An important property of the kernel buffers is that they are congruous in physical RAM and are never paged out by the VM system. However, the free pool may be shared as a common resource for all applications.

For data transmission, the following steps occur.

1. The operating system device driver creates kernel buffers for use for transmission and initializes the Tx ring of the NIC.
2. An application that is to transmit data stores that data in an application buffer and requests transmission by the OS, e.g. by performing a send( ) system call (supplying the address and size of the application buffer).
3. In response to the send( ) call, the OS kernel copies the data from the application buffer into the kernel buffer and applies the appropriate protocol stack (e.g. TCP/IP).
4. A pointer to the kernel buffer containing the data is placed in the next free slot on the Tx ring. If no slot is available, the buffer is queued in the kernel until the NIC indicates e.g. by interrupt that a slot has become available.
5. When the slot comes to be processed by the NIC it accesses the kernel buffer indicated by the contents of the slot by DMA cycles over the host IO bus and then transmits the data.

Considering the data movement through the system, it should be noted that in the case of data reception the copy of data from the kernel buffer into the application buffer actually leaves the data residing in the processor's cache and so even though there appears to be a superfluous copy using this mechanism, the copy actually serves as a cache load operation. In the case of data transmission, it is likely that the data that is to be transmitted originated from the cache before being passed to the application for transmission, in which case the copy step is obviously inefficient. There are two reasons for the copy step:

1. To ensure the data is in pinned down kernel memory during the time that the NIC is copying the data in or out. This applies when data is being transmitted or received and also has the benefit that the application is not able to tamper or damage the buffer following kernel protocol processing.
2. In the case of transmission it is often the case that the send( ) system call returns successfully before the data has been actually transmitted. The copy step enables the OS to retain the data in case retransmission is required by the protocol layer.

Even if the copy step were omitted, on data reception, a cache load would take place when the application accessed the kernel buffer. Many people have recognized (see, e.g. U.S. Pat. No. 6,246,683) that these additional copies have been the cause of performance degradation. However, the solutions presented so far have all involved some excess data movement. It would be desirable to reduce this overhead. The inventors of the present invention have recognised that an overlooked problem is not the copying, but the user to kernel context switching and interrupt handling overheads. U.S. Pat. No. 6,246,683, for instance, does nothing to avoid these overheads.

During a context switch on a general purpose operating system many registers have to be saved and restored, and TLB entries and caches may be flushed. Modern processors are heavily optimized for sustained operation from caches and architectural constraints (such as the memory gap) are such that performance in the face of large numbers of context switches is massively degraded. Further discussion of this is given in "Piglet: A Low-intrusion Vertical Operating System", S. J. Muir and J. M. Smith, Tech. rep. MS-CIS-00-04, Univ. of PA, January 2000. Hence it would be desirable to reduce context switches during both data transfer and connection management.

In order to remove the cost of context switches from data transmission and reception, VIA (Virtual Interface Architecture) was developed as an open standard from academic work in U-NET. Further information is available in the Virtual Interface Architecture Specification available from www.vidf.org. Some commercial implementations were made and it has since evolved into the Infiniband standard. The basic principle of this system is to enhance the network interface hardware to provide each application (network endpoint) with its own pair of DMA queues. $T_x$ and $R_x$). The architecture comprises a kernel agent, a hardware NIC, and a user/application level interface. Each application at the user level is given control of a VI (Virtual Interface). This comprises two queues, one for transmission, one for reception (and an optional CQ completion queue). To transmit some data on a VI, the application must:

1. Ensure data is in a buffer which has been pinned down. (This would require a system call to allocate)
2. Construct a descriptor which contains a buffer pointer and length and add a pointer to the descriptor onto the send queue. (N.B. the descriptor must also be in pinned down memory).
3. If necessary the application indicates that the work queue is active by writing to a hardware "doorbell" location on the NIC which is associated with the VI endpoint.
4. At some time later the NIC processes the send queue and DMAs the data from the buffer, forms a network packet and transmits to the receiver. The NIC will then mark the descriptor associated with the buffer to indicate that the data has been sent.

It is possible to also associate the VI with a completion queue. If this has been done the NIC will post an event to the completion queue to indicate that the buffer has been sent. Note that this is to enable one application to manage a number of VI queues by looking at the events on only one completion queue.

Either the VI send queue or completion queue may be enabled for interrupts.

To receive a buffer the application must create a descriptor which points to a free buffer and place the descriptor on the receive queue. It may also write to the "doorbell" to indicate that the receive queue is active.

When the NIC has a packet which is addressed to a particular VI receive queue, it reads the descriptor from the queue and determines the Rx buffer location. The NIC then DMAs the data to the receive buffer and indicates reception by:

1. marking the descriptor
2. generating an event on the completion queue (if one has been associated with the VI)
3. generating an interrupt if one has been requested by the application or kernel (which marks either the $R_x$ queue or completion queue).

There are problems with this queue based model:
1. Performance for small messages is poor because of descriptor overheads.
2. flow control must be done by the application to avoid receive buffer overrun.

Also, VIA does not avoid context switches for connection setup and has no error recovery capabilities. This is because it was intended to be used within a cluster where there are long-lived connections and few errors. If an error occurs, the VI connection is simply put into an error state (and usually has to be torn down and recreated).

VIA connection setup and tear down proceeds using the kernel agent in exactly the same manner as described for kernel stack processing. Hence operations such as Open, Connect, Accept etc all require context switches into the kernel. Thus in an environment where connections are short lived (e.g. WWW) or errors are frequent (e.g. Ethernet) the VIA interface performs badly.

VIA represents an evolution of the message passing interface, allowing user level access to hardware. There has also been another track of developments supporting a shared memory interface. Much of this research was targeted at building large single operating system NUMA (non-uniform memory architecture) machines (e.g. Stanford DASH) where a large supercomputer is built from a number of processors, each with local memory, and a high-speed interconnect. For such machines, coherency between the memory of each node was maintained by the hardware (interconnect). Coherency must generally ensure that a store/load operation on $CPU_1$ will return the correct value even where there is an intervening store operation on $CPU_2$. This is difficult to achieve when $CPU_1$ is allowed to cache the contents of the initial store and would be expected to return the cached copy if an intervening write had not occurred. A large part of the IEEE standard for SCI (Scalable Coherent Interconnect) is taken up with ensuring coherency. The standard is available from www.vesa.org.

Because of the NUMA and coherency heritage of shared memory interconnects, the management and failure modes of the cluster were that of a single machine. For example implementations often assumed.

1. Single network address space which was managed by a trusted cluster-wide service (e.g. DEC's Memory Channel: see R Gillett Memory Channel Network for PCI, IEEE Micro 16(2), 12-18 Feb. 96)
2. No protection (or no page level protection) measures to protect local host memory from incoming network access (e.g. SCI)
3. Failure of a single processor node causing failure of whole "machine" (e.g. SCI)

In a Memory Channel implementation of a cluster wide connection service, physically, all network writes are passed to all nodes in the cluster at the same time, so a receiving node just matches writes against its incoming window. This method does provide incoming protection (as we do), but address space management requires communication with the management node and is inefficient.

SCI is similar except that 12 bits of the address space is dedicated to a node identifier so that writes can be directed to a particular host. The remaining 48 bits is host implementation dependent. Most implementations simply allocate a single large segment of local memory and use the 48 bits as an offset.

No implementation has addressed ports or distributed connection management as part of its architecture.

Some implementations provide an event mechanism, where an event message can be sent from one host to another (or from network to host). When these are software programmable, distributed connection set up using ports is possible. However, since these mechanisms are designed for (rare) error handling (e.g. where a cable is unplugged), the event queue is designed to be a kernel only object—hence context switches are still required for connection management in the same manner as the VIA or kernel stack models.

BRIEF SUMMARY OF THE INVENTION

According to one aspect of the present invention there is provided a communication interface for providing an interface between a data link and a data processor, the data processor being capable of supporting an operating system and a user application, the communication interface being arranged to: support a first queue of data received over the link and addressed to a logical data port associated with a user application; support a second queue of data received over the link and identified as being directed to the operating system; and analyse data received over the link and identified as being directed to the operating system or the data port to determine whether that data meets one or more predefined criteria, and if it does meet the criteria transmit an interrupt to the operating system.

Conveniently the user application has an address space and the first queue is located in that address space. Conveniently the operating system has an address space and the second queue is located in that address space. Most conveniently at least part of the address space of the user application is the same as at least part of the address space of the operating system. Preferably the all the address space of the user application lies within the address space of the operating system.

The communication interface is preferably arranged apply to the first queue data received over the link and identified as being directed to the data port. The communication interface is preferably arranged apply to the second queue data received over the link and identified as being directed to the operating system.

Preferably one of the predefined criteria is such that if the data received over the link matches one or more predetermined message forms then the communication interface will transmit an interrupt to the operating system.

Preferably the communication interface is arranged to, if the data meets one or more of the predefined criteria and one or more additional criteria transmit an interrupt to the operating system and transmit a message to the operating system indicating a port to which the data was addressed. Preferably the additional criteria are indicative of an error condition.

Preferably the communication interface is arranged to support a third queue of data received over the link and addressed to a logical data port associated with a user application, and is arranged to apply to the first queue data units received over the link and of a form having a fixed length and to apply to the third queue data units received over the link and of a form having a variable length. Preferably the data units of a fixed size include messages received over the link and interpreted by the communication interface as indicating an error status. Preferably the data units of a fixed size include or may include messages received over the link and interpreted by the communication interface as indicating a request for or acknowledgement of set-up of a connection. Preferably the data units of a fixed size include messages received over the link and interpreted by the communication interface as indicating a data delivery event.

Preferably the communication interface is arranged to analyse the content of each data unit received over the link and to determine in dependence on the content of that data unit which of the said queues to apply the data unit to.

Preferably the communication interface is configurable by the operating system to set the said criteria.

Preferably one or both of the communication interface and the operating system is responsive to a message of a predetermined type to return a message including information indicative of the status of the port.

According to the present invention there is also provided a communication system including a communication interface as set out above and the said data processor.

The data processor is preferably arranged to, when the processing of an application with which a data port is associated is suspended, set the criteria such that the communication interface will transmit an interrupt to the operating system on receiving data identified as being directed to that data port.

According to a second aspect of the present invention there is provided a communication interface for providing an interface between a data link and first data processing apparatus including a memory, the data interface being such that a region of the memory of the first data processing apparatus can be mapped on to memory of a second data processing apparatus connected to the communication interface by the link, the communication interface being arranged to, on establishing a mapping of a first range of one or more memory locations in the second data processing apparatus on to a second range of one or more memory locations in the first data processing apparatus, transmit to the second data processing apparatus data identifying the first range of memory locations.

Preferably the memory of the second data processing apparatus is virtual memory. Preferably the memory locations in the memory of the second data processing apparatus are virtual memory locations. Most preferably said one or more memory locations in the memory of the first data processing apparatus are one or more virtual memory locations and the communication interface is arranged to, on establishing the said mapping, establish a further mapping of the one or more virtual memory locations on to one or more physical memory locations in the memory of the first data processing apparatus Preferably the communication interface is arranged to, on establishing a mapping of a first range of one or more memory locations in the memory of the second data processing apparatus on to a second range of one or more memory locations in the memory of the first data processing apparatus, allocate an identity to that mapping and transmit that identity to the second data processing apparatus Preferably the communication interface is capable of communicating by means of data messages which specify a destination port to which data they contain is to be applied.

Preferably the communication interface is arranged to, on establishing a mapping of a first range of one or more memory locations in the memory of the second data processing appa- ratus on to a second range of one or more memory locations in the memory of the first data processing apparatus, determine check data and transmit the check data to the second data processing apparatus, and wherein the communication interface is arranged to reject subsequent communications over the mapping which do not indicate the check data. Preferably the check data is randomly generated by the communication interface. Conveniently, to indicate the check data a communication includes the check data.

Preferably the communication interface is arranged to modify the check data, according to a predefined scheme, during the operation of the mapping. Then it is subsequent communications over the mapping that do not indicate that modified data that the communication interface is preferably arranged to reject. Preferably the check data represents a number and the predefined scheme is to increment the number represented by the check data by a predefined amount each time a predefined number of communications over the mapping is accepted. The predefined amount is preferably but not necessarily one. The predefined number is preferably but not necessarily one.

Preferably the communication interface is arranged to reject subsequent communications over the mapping which indicate a request for accessing data outside the first range.

According to the present invention there is also provided a communication system including a communication interface as set out above and the said data processor.

The data processor is preferably capable of supporting an operating system and a user application. The system preferably comprises a data store which stores items of data defining operation parameters for communications over the data link to transmit data stored in the first range or receive data for storage in the first range.

The operating system may be arranged to permit a user application to access one or more items of data in the data store dependent on a level of trust granted to the application.

The check data is preferably stored as one of the items of data in the data store, the operating system is arranged to permit at least some user applications to have write access to that item of data, and the communication interface is arranged to, in order to determine the check data, read the content of that item of data and treat it as the check data.

Preferably items of data in the data store define the start and end points of the first range of memory locations in the memory of the first data processing apparatus and store the start and end points of the second range of memory locations in the memory of the second data processing apparatus. Preferably the operating system is arranged to permit applications having one or more levels of trust to have write access to the items of data in the data store that second, and store the start and end points of the second range of memory locations in the memory of the second data processing apparatus and to permit no applications to have write access to the items of data in the data store that define the start and end points of the first range of memory locations in the memory of the first data processing apparatus.

The present invention will now be described by way of example with reference to the accompanying drawings.

Preferably the communication interface is capable of supporting a plurality of mappings each of a respective first range of one or more virtual memory locations in the second data processing apparatus on to a respective second range of one or more memory locations in the first data processing apparatus, and for each such mapping a respective further mapping of the respective one or more virtual memory locations on to one or more physical memory locations in the memory of the first data processing apparatus.

Preferably the communication interface includes a translation interface for translating accesses to or from each of the said ranges of one or more virtual memory locations into accesses to or from the respective one or more physical memory locations in the memory of the first data processing apparatus and for translating accesses to or from each of the one or more physical memory locations in the memory of the first data processing apparatus into accesses to or from the respective ranges of one or more virtual memory locations. Preferably the virtual memory locations are local bus addresses, for example PCI bus addresses. An access to a location is suitably a write access to that location. An access from a location is suitably a read access from that location.

Preferably the communication interface comprises a mapping memory arranged to store specifications of the said further mappings. The mapping memory preferably comprises a first mapping memory local to the translation interface, and a second mapping memory less local to the translation interface than the first mapping memory, and wherein the communication interface is arranged to store specifications of all of the further mappings in the second mapping memory, and to store specifications of only some of the further mappings in the first mapping memory. Preferably the first mapping memory is an associative memory.

Preferably the translation interface is arranged to, in order to translate between an access to or from one of the said ranges of one or more virtual memory locations and an access to or from the respective one or more physical memory locations in the memory of the first data processing apparatus, preferentially access the first mapping memory to implement the translation, and if the specification of the mapping of the range of virtual memory locations the subject of the access is not stored in the first mapping memory to access the second mapping memory to implement the translation.

Preferably the communication interface is arranged to store specifications of the most recently used further mappings in the first mapping memory. Preferably it is arranged to, if an attempt to access a specification from the first mapping memory is unsuccessful, replace a specification in the first mapping memory with the specification the attempt to access which was unsuccessful.

BRIEF DESCRIPTION OF THE SEVERAL VIEWS OF THE DRAWINGS

In the drawings:

FIG. 11 shows an example of an incoming aperture table;

DETAILED DESCRIPTION OF THE INVENTION

Figure 1:
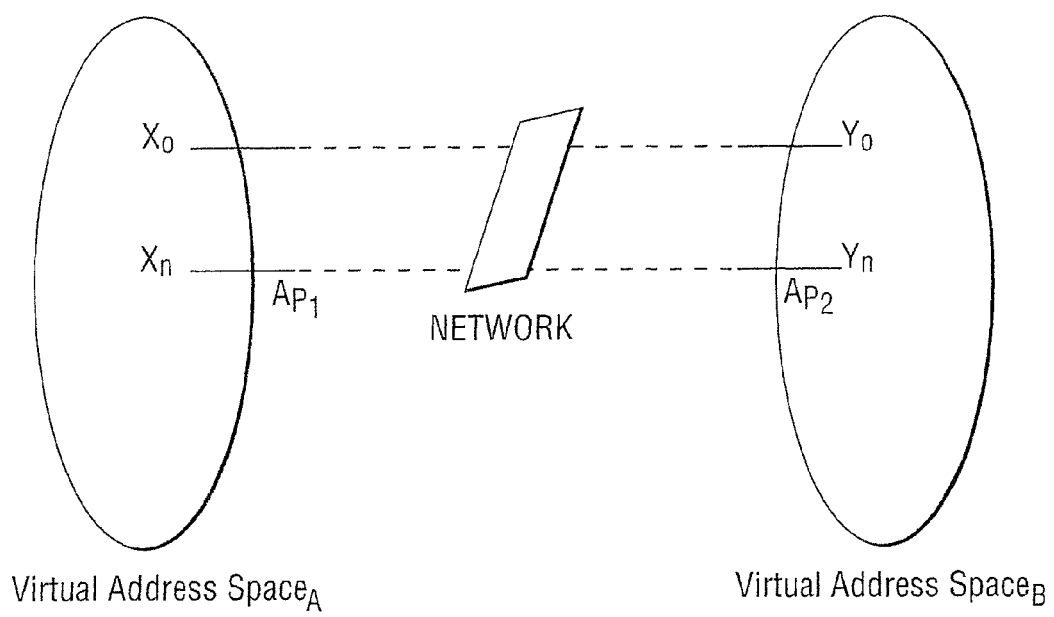
FIG. 1 illustrates mapping of one address space on to another over a network.
Figure 2:
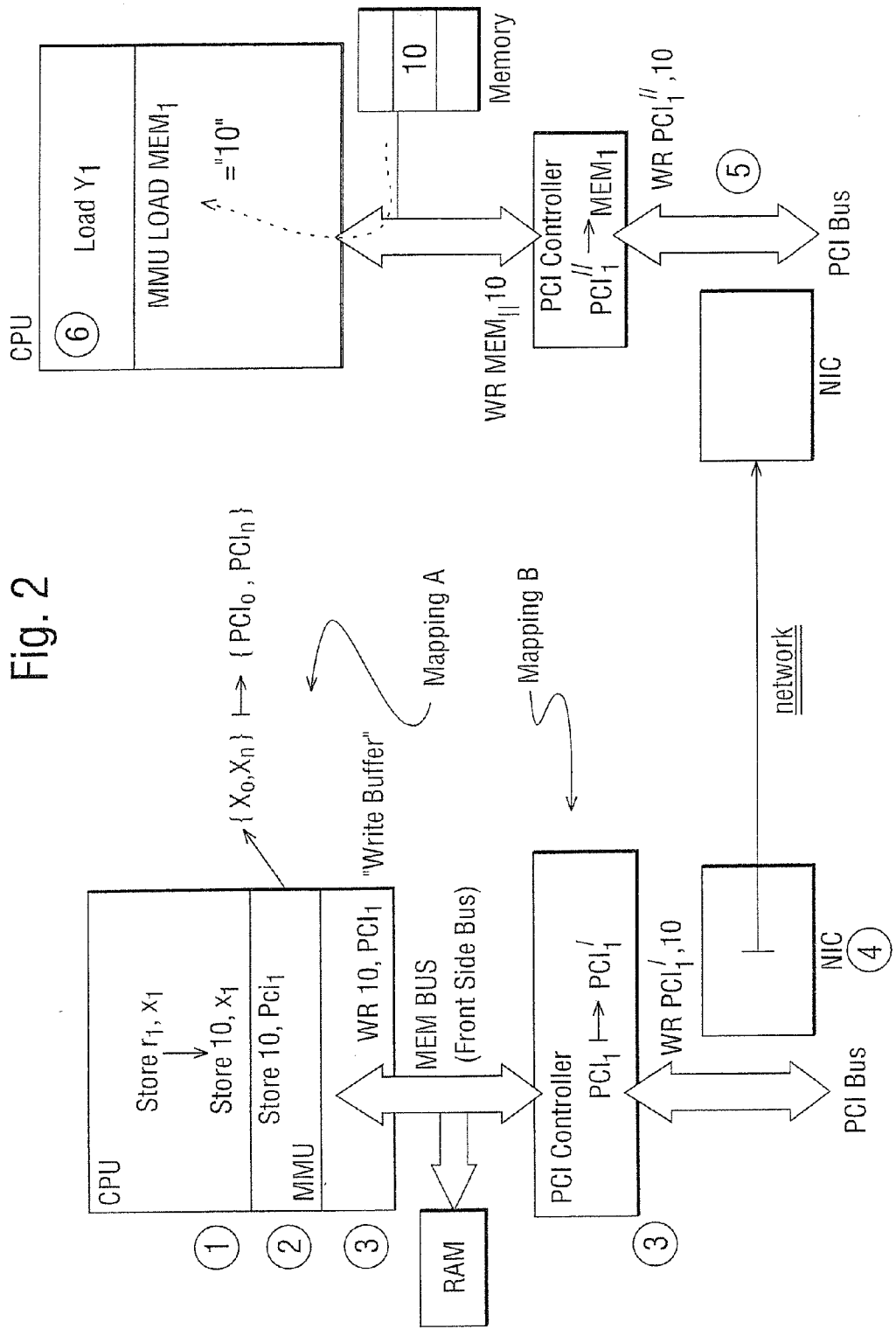
FIG. 2 illustrates the architecture of a prior art memory mapped architecture.
Figure 3:
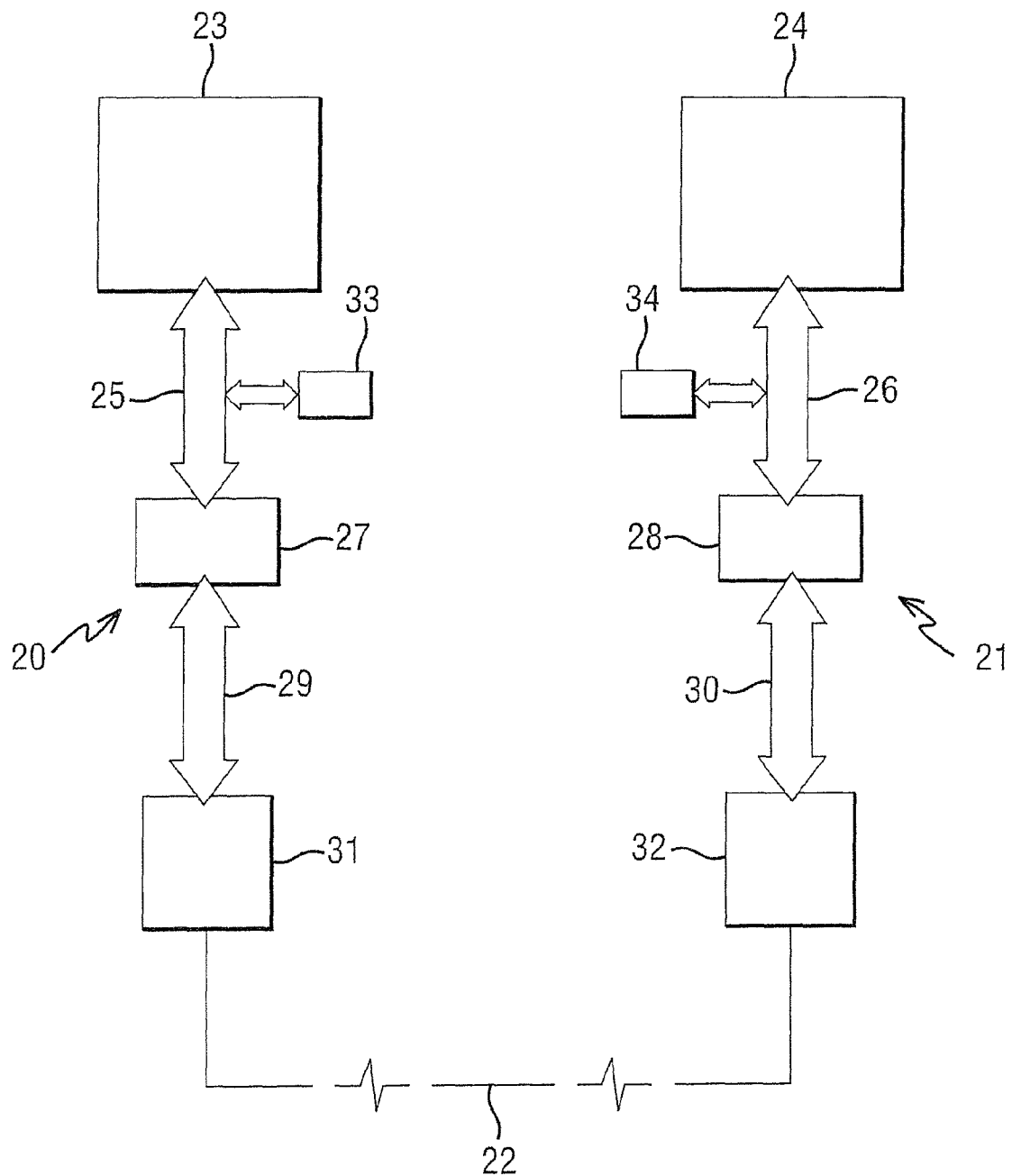
FIG. 3 is a schematic diagram of a data transmission system.

FIG. 3 is a schematic diagram of a data transmission system whereby a first data processing unit (DPU) 20 can communicate with a second data processing unit 21 over a network link 22. Each data processing unit comprises a CPU 23, 24 which is connected via a memory bus 25, 26 to a PCI controller 27, 28. The PCI controllers control communications over respective PCI buses 29, 30, to which are connected NICs 31, 32. The NICs are connected to each other over the network. Other similar data processing units can be connected to the network to allow them to communicate with each other and with the DPUs 20, 21. Local random access memory (RAM) 33, 34 is connected to each memory bus 25, 26.

The data transmission system described herein implements several significant features: (1) dynamic caching of aperture mappings between the NICs 31, 32; (2) a packet oriented setup and teardown arrangement for communication between the NICs; and (3) the use of certain bits that are herein termed "nonce bits" in the address space of one or both NICs.

Dynamic Caching of Aperture Entries

Figure 4:
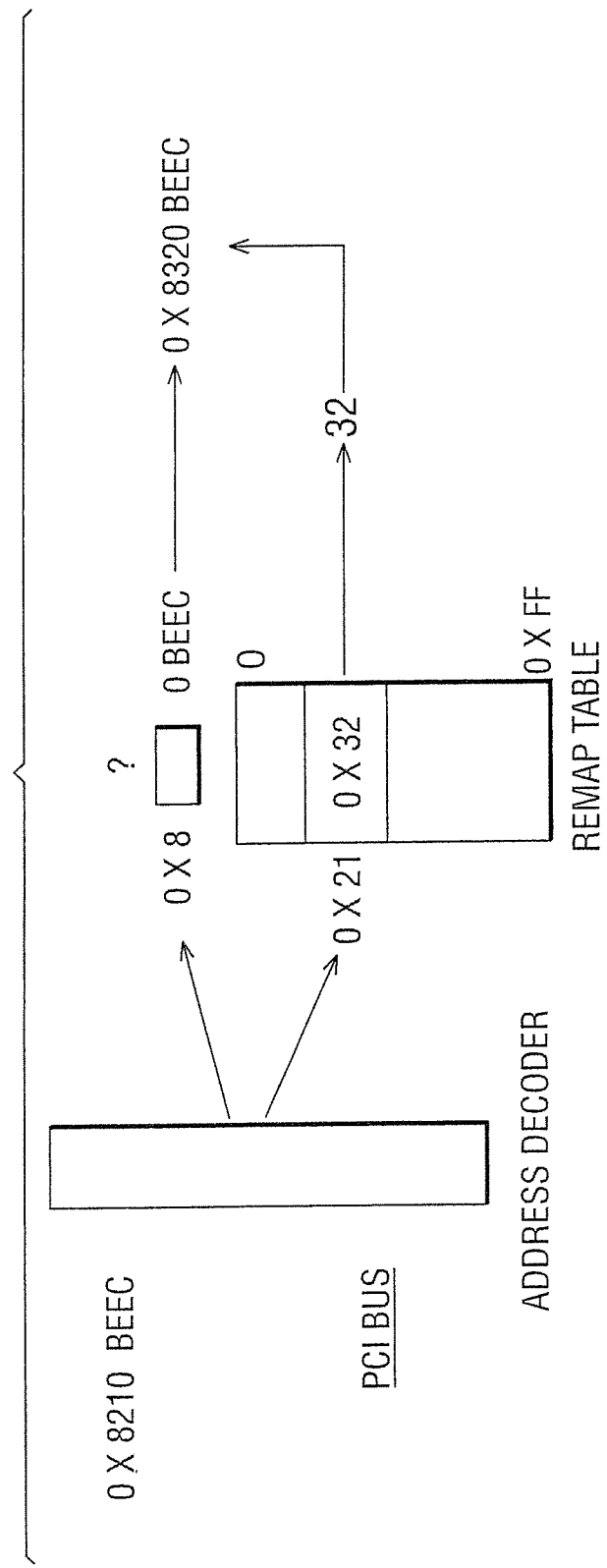
FIGS. 4 and 5 illustrate mapping of bits of an address.

A small number of aperture mappings can be stored efficiently using a static table. To implement this, a number of bits (the map bits) of an address are caught by the address decode logic of an NIC and are used as an index into an array of memory which contains the bits that are used for reversing the mapping (the remap bits). For example, in a system of the type illustrated in FIG. 3 an NIC might receive over the PCI bus 29 a request for reading or writing data at a specified local address. The NIC stores a mapping that indicates the remote address that corresponds to that local address, the transformation being performed by substituting one or more of the bits of the local address. For example, the second and third nibbles of the address could be substituted. In that case to access the remote address that corresponds to a local address of 0x8210BEEC the NIC would access the mapping table, determine the mapping for bits "21" (suppose that is bits "32") and then address the corresponding remote address (in this example 0x8320BEEC). (See FIG. 4)

Figure 5:
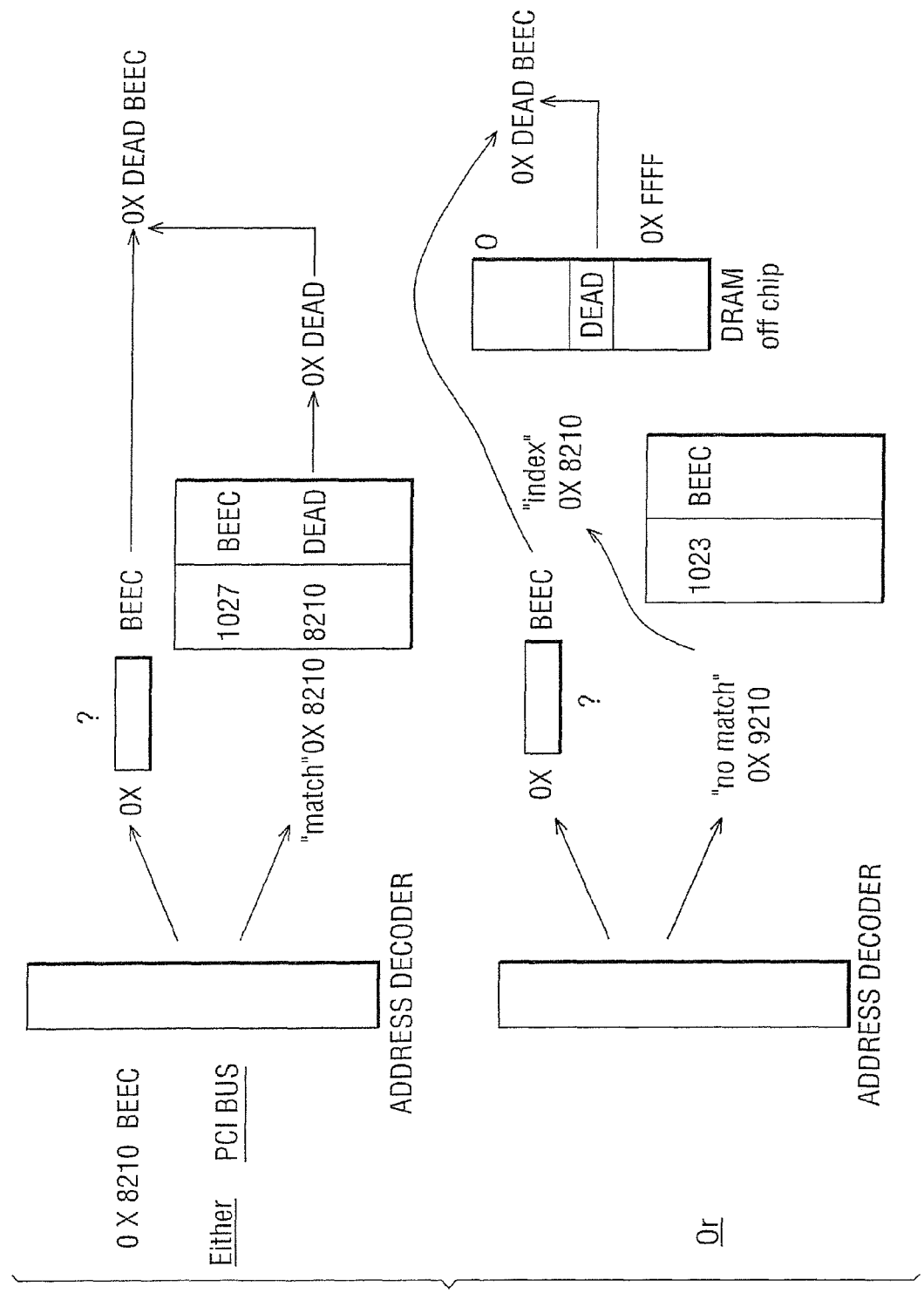

This method is scalable up to a few hundred or thousand entries depending on the implementation technology used (typically FPGA or ASIC) but is limited by the space available within the device that is used to hold the mapping table. A superior method of implementation is to store the mappings in a larger store (to which access is consequently slower) and to cache the most recently used mappings in an associative memory that can be accessed quickly. If a match for the bits that are to be substituted is found in the associative memory (by a hardware search operation) then the remap is made very quickly. If no match is found the hardware must perform a secondary lookup in the larger memory (in either a table or tree structure). Typically the associative memory will be implemented on the processing chip of the NIC, and the larger memory will be implemented off-chip, for example in DRAM. This is illustrated in FIG. 5. This method is somewhat similar to the operation of a TLB on a CPU; however here it is used for an entirely different function: i.e. for the purpose of aperture mapping on a memory mapped network card.

In practice, the mapping information must contain all the address information required to transmit a packet over a network. This is discussed in more detail below.

Packet Oriented Connection Setup and Tear Down Protocol

Figure 6:
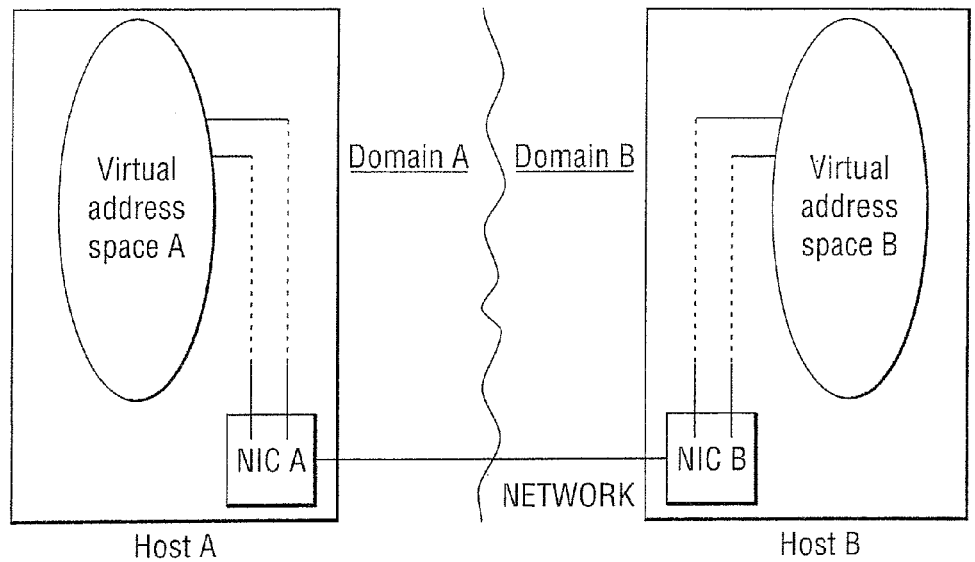
FIG. 6 illustrates memory space apertures and their management domains.

A protocol will now be described for establishing a connection between two applications' address spaces using apertures, where there are two administration domains (one belonging to each of the communicating hosts). The general arrangement is illustrated in FIG. 6. In domain A there is a host A having a virtual address space A and an NIC A that can access the virtual address space. In domain B there is a host B having a virtual address space B and an NIC B that can access the virtual address space. The NICs are connected together over a network.

In this example mapping entries for devices in domain A can only be set by the operating system on host A. A further implementation in which an application A running on host A is allowed to set some (but not all) bits on an aperture mapping within domain A is described below.

The connection protocol to be described uses IP (Internet Protocol) datagrams to transfer packets from one host to another (just as for standard Ethernet networks). The datagrams are addressed as <host:port> where <host> is the network identifier of the destination host and <port> is an identifier for the application (NB each application may have a number of allocated parts corresponding to different network connections) within the host. It will be appreciated that the present protocol could be used over other transport protocols than IP.

In the present protocol the connection setup proceeds as follows, assuming host A wishes to make an active connection to a passive (accepting) host B on which an application B is running.

1. Application B publishes its accepting internet address <$host_B$:$port_B$> this can be accessed over the network in the normal way.
2. Application A (which for convenience will be referred to as host A) presents a request to Operating System A for the creation of an incoming aperture onto memory within host A to be used for communication. Once this aperture has been defined its details are programmed on NIC A so that incoming network writes that are directed to addresses in that virtual space will be directed onto the corresponding real addresses in memory A. The aperture will be given a reference address: in-index A.
3. The host A sends an IP datagram to <$host_B$:$port_B$> which contains: the connect message:
[CONNECT/in-index$_A$]
Note that the full IP datagram will also contain source and destination IP addresses (and ports), as normal.
4. The connect message is received by application B. The message may be received either directly to user level or to the operating system (according to the status of the dual event queue) as described later.
5. Host B recognises the message as being a request to connect to B, offering the aperture in-index A. Using rules pre-programmed at B (typically for security reasons) host B will decide whether to reject or accept the connection. If B decides to accept the connection, it creates an (or uses a pre-created) incoming aperture which is mapped onto memory B and is given reference address: in-index$_B$. Host B may choose to create a new port for the connection: port'$_B$. Host B sends back to host A an accept message as an IP datagram:
[ACCEPT/:port'$_B$/in-index$_B$]
to host A. Note that the full IP datagram will also contain source and destination IP addresses (and ports), as normal.
Once this has been received, each host has created an aperture, each NIC is set up to perform the mapping for requests to read or write in that aperture, and each host knows the reference address of the other host's aperture.
6. Following the messaging discussed so far, both hosts create outgoing apertures. A creates an aperture which maps application A's virtual address space onto NIC$_A$ outgoing aperture OUT_index$_A$. This outgoing aperture maps onto [$host_B$:in-index$_B$] which maps onto memory B. Host B creates a similar outgoing aperture out-index$_B$ which maps onto memory A. By this means, bi-directional communication is possible through the memory mapped regions. At any time the applications may send a message to the port, which is associated with the memory mapping. These may be used to guarantee out of band data for example:

(a) A CLOSE message to indicate that the connection and hence memory mappings should be closed down
(b) An ALIVE message to request a response from an non-responding application [ALIVEACK would be the response]
(c) An ERROR message which us generated by any hardware element on the data path which has detected a data transfer error. This message is important because it allows feedback to be provided from the memory mapped interface.

Note that where an application already has a virtual address mapping onto an outgoing aperture, step 6 reduces to a request for the NIC to map the outgoing aperture onto a particular host's incoming aperture. This is described further in terms of user level connection management below.

Dual Event Queues

Figure 7:
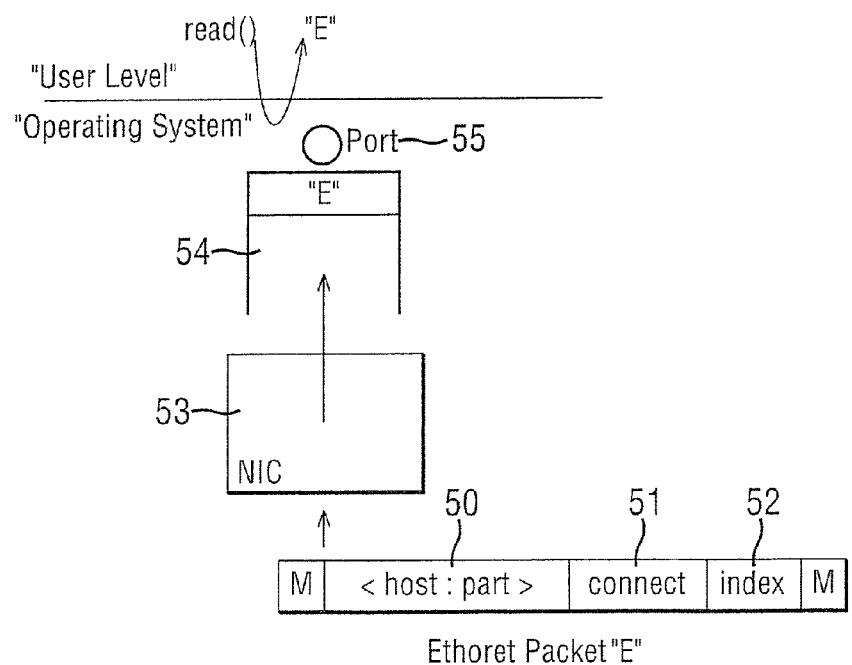
FIG. 7 illustrates features of a port.

In the present context a port will be considered to be an operating system specific entity which is bound to an application, has an address code, and can receive messages. This concept is illustrated in FIG. 7. One or more incoming messages that are addressed to a port form a message queue, which is handled by the operating system. The operating system has previously stored a binding between that port and an application running on the operating system. Messages in the message queue for a port are processed by the operating system and provided by the operating system to the application to which that port is bound. The operating system can store multiple bindings of ports to applications so that incoming messages, by specifying the appropriate port, can be applied to the appropriate application.

The port exists within the operating system so that messages can be received and securely handled no matter what the state of the corresponding application. It is bound (tethered) to a particular application and has a message queue attached. In traditional protocol stacks, e.g. in-kernel TCP/IP all data is normally enqueued on the port message queue before it is read by the application. (This overhead can be avoided by the memory mapped data transfer mechanism described herein).

In the scheme to be described herein, only out of band data is enqueued on the port message queue. FIG. 7 illustrates this for a CONNECT message. In FIG. 7, an incoming packet E, containing a specification of a destination host and port (field 50), a message type (field 51) and an index (field 52), is received by NIC 53. Since this data is a CONNECT message it falls into the class of out of band data. However, it is still applied to the message queue 54 of the appropriate port 55, from where it can be read by the application that has been assigned by the operating system to that port.

A further enhancement is to use a dual queue, associated with a port. This can help to minimise the requirements to make system calls when reading out of band messages. This is particularly useful where there are many messages e.g. high connection rate as for a web server, or a high error rate which may be expected for Ethernet.

At the beginning of its operations, the operating system creates a queue to handle out of band messages. This queue may be written to by the NIC and may have an interrupt associated with it. When an application binds to a port, the operating system creates the port and associates it with the application. It also creates a queue to handle out of band messages for that port only. That out of band message queue for the port is then memory mapped into the application's virtual address space such that it may de-queue events without requiring a kernel context switch.

The event queues are registered with the NIC, and there is a control block on the NIC associated with each queue (and mapped into either or both the OS or application's address space(s)).

Figure 8:
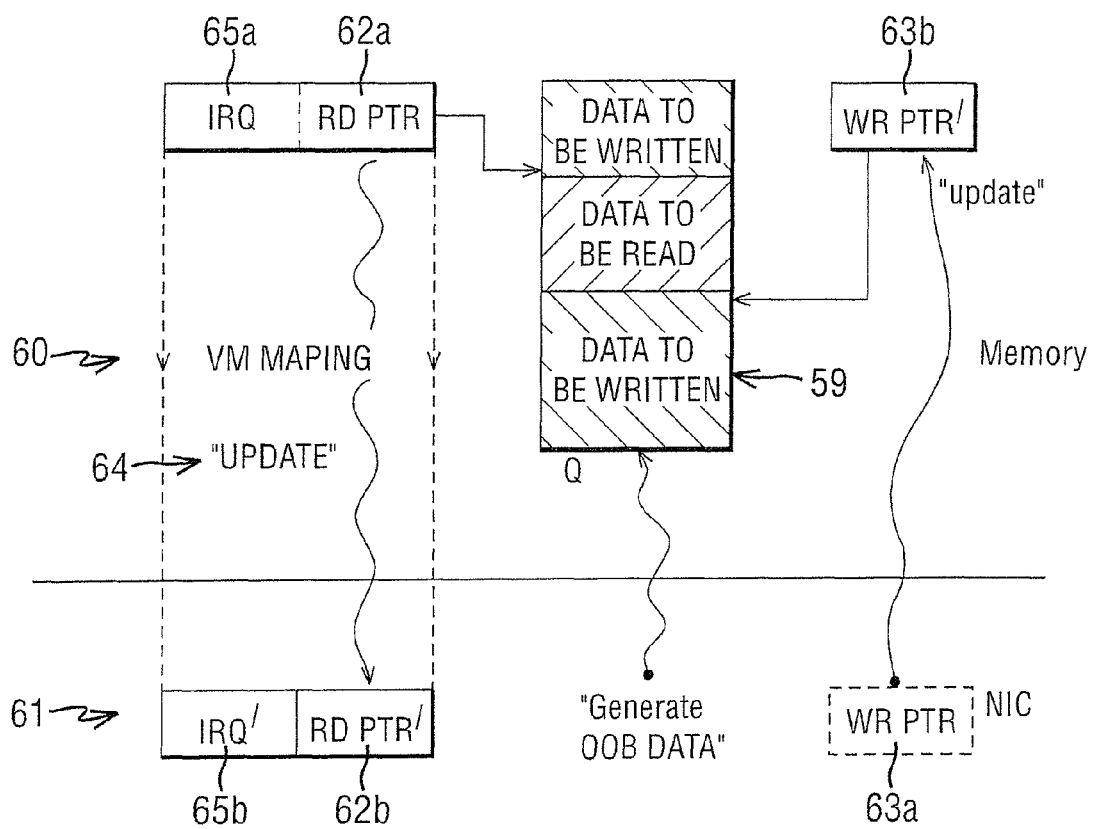
FIG. 8 illustrates a queue with control blocks.

A queue with control blocks is illustrated in FIG. 8. The queue 59 is stored in memory 60, to which the NIC 61 has access. Associated with the queue are a read pointer (RDPTR) 62*a* and a write pointer (WRPTR) 63*a*, which indicate the points in the queue at which data is to be read and written next. Pointer 62*a* is stored in memory 60. Pointer 63*a* is stored in NIC 61. Mapped copies of the pointers: RDPTR' 62*b* and WPTR' 63*b* are stored in the other of the NIC and the memory than the original pointers. In the operation of the system:

1. The NIC can determine the space available for writing by comparing RDPTR' and WRPTR, which it stores locally.
2. NIC generates out of band data when it is received in a datagram and writes it to the queue 59.
3. The NIC updates WRPTR and WRPTR' when the data has been written, so that the next data will be written after the last data.
4. The application determines the space available for reading by comparing RDPTR and WRPTR' as access from memory 60.
5. The application reads the out of band data from queue 59 and processes the messages.
6. The application updates RDPTR and RDPTR'.
7. If the application requires an interrupt, then it (or the operating system on its behalf) sets the IRQ 65*a* and IRQ' 65*b* bits of the control block 64. The control block is stored in memory 60 and is mapped onto corresponding storage in the NIC. If set, then the NIC would also generate an interrupt on step 3.

If an interrupt is generated, then firstly the PCI interrupt line is asserted to ensure the computer's interrupt handler is executed, but also a second message is delivered into the operating system's queue. In general, this queue can handle many interrupt types, such as hardware failure, but in this case, the OS queue contains the following message [ODB-DATA:PORT] indicating that out of band data has been delivered to the application queue belonging to [PORT]. The OS can examine the data in queue 59 and take appropriate action. The usual situation will be that the application is blocked or descheduled and the OS must wake it (mark as runnable to the scheduler).

Figure 9:
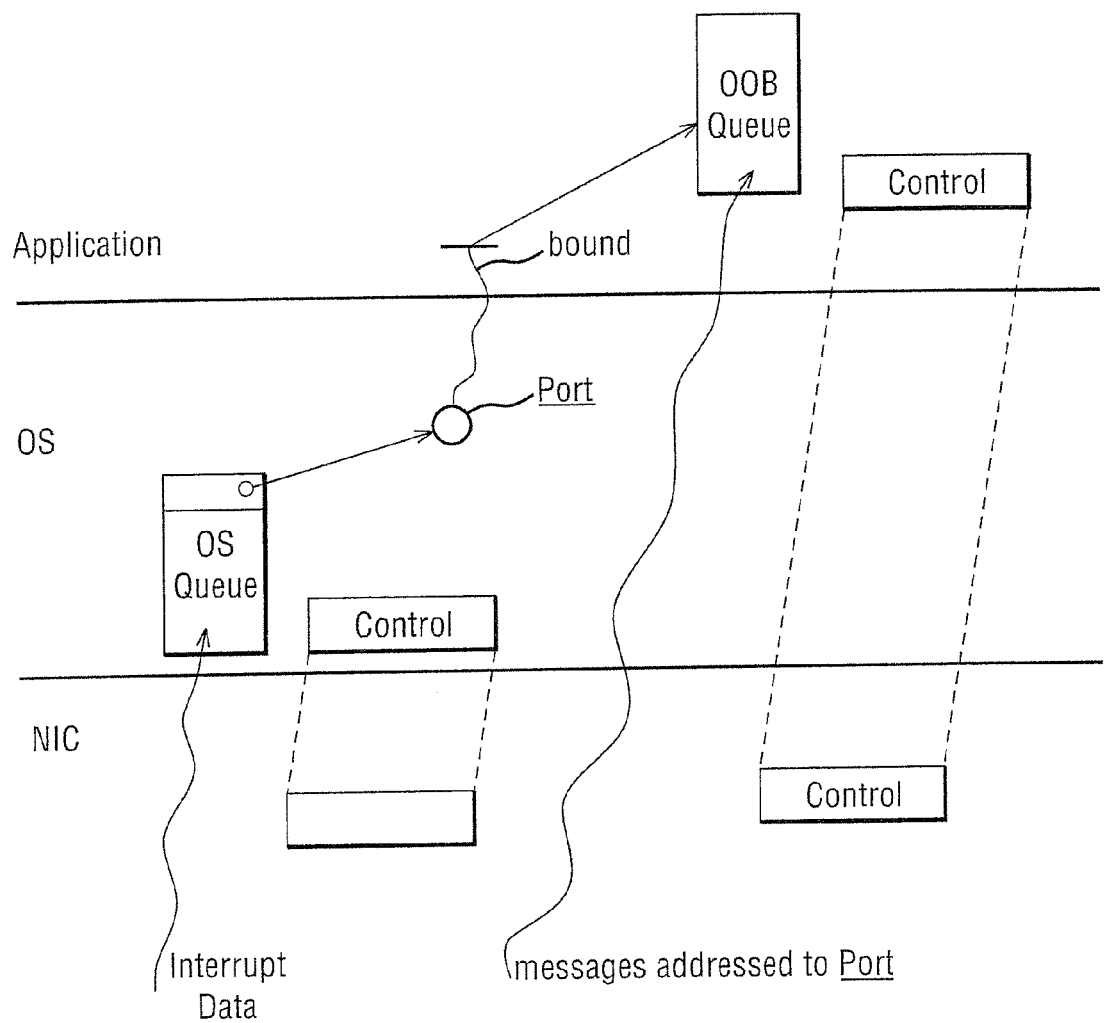
FIG. 9 illustrates a dual queue mechanism.

This dual queue mechanism enables out of band data to be handled by the application without involving the OS—while the application is running. Where the application(s) is blocked, the second queue and interrupt enable the OS to determine which of potentially many application queues have had data delivered. The overall arrangement is illustrated in FIG. 9.

The out of band (OOB) queue holds out of band data, which are:
1. Error events associated with the port
2. Connection setup messages and other signalling messages from the network and other applications
3. Data delivery events, which may be generated either by the sending application the NIC or the receiving OS.

If the queue is to contain variable sized data then the size of the data part of each message must be included at the start of the message.

When applications are to communicate in the present system over shared memory, a single work queue can be shared between two communicating endpoints using non-coherent shared memory. As data is written into the queue, write pointer (WRPTR) updates are also written by the transmitting application into the remote network-mapped memory to indicate the data valid for reading. As data is removed from the queue, read pointer (RDPR) updates are written by the receiving application back over the network to indicate free space in the queue.

These pointer updates are conservative and may lag the reading or writing of data by a short time, but means that a transmitter will not initiate a network transfer of data until buffer is available at the receiver, and the low latency of the pointer updates means that the amount of queue buffer space required to support a pair of communicating endpoints is small. The event mechanism described above can be used to allow applications to block on full/empty queues and to manage large numbers of queues via a multiplexed event stream, which is scalable in terms of CPU usage and response time.

Figure 13:
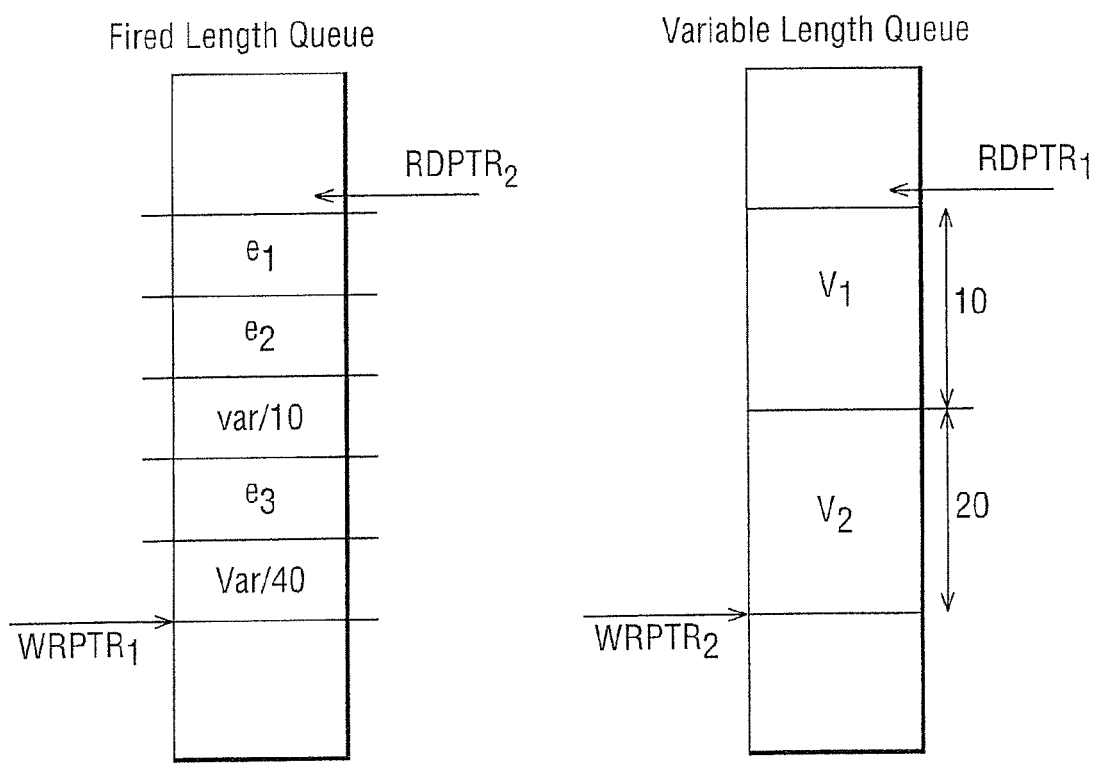
FIG. 13 illustrates the operation of pointers in fixed and variable length queues.

Variable length data destined for an event queue would be delivered to a second queue. This has the advantage of simplifying the event generation mechanism in hardware. Thus the fixed size queue contains simple events and pointers (size) into the variable length queue 1. As shown in FIG. 13, the difference between RDPTR, and WRPTR, indicates the valid events in the queue, and also the number of events because they are of fixed size.
2. The event Var 10 (for illustration) indicates that a variable sized event of size 10 words has been placed on the variable sized queue.
3. The difference between $WRPTR_2$ and $RDPTR_2$ indicates only the number of words which are in the variable sized queue, but the application is able to dequeue the first event in its entirety by removing 10 words.
4. The application indicates processing of an event to the NIC by updating the RDPTR on the NIC's memory
   (a) for the static queue by the number of events processed multiplied by the size of each event
   (b) for the variable sized queue by the number of words consumed (i.e. the same for both cases)
5. The data on the variable length queue may also contain the size (e.g. if it is a UDP/IP packet)

Enhanced Aperture Mappings and "Nonce Bits"

In this implementation, additional bits, termed "nonce bits" are provided in order to protect against malfunctioning or malicious hardware or software writing inadvertently to apertures. To illustrate this, the following network mapping will be discussed:

<virtual memory address> → <PCI address> → <host:in-index> → ...
...<network packet> → <PCI address> → <physical memory address> →
...
...<virtual memory address>

When performing the mapping to <host in-index> the NIC is able to create an outgoing packet which is addressed by <host: in-index>. This will be recognized by the NIC that receives the packet as being a packet intended for processing as an aperture packet, rather than as a packet intended to pass via a port to a corresponding application. Thus the packet is to be presented to the incoming aperture lookup hardware.

It should first be noted that under the scheme described above, the PCI address to which the data is sent encodes both the aperture mapping and an offset within the aperture. This is because the NIC can form the destination address as a function of the address to which the message on the PCI bus was formed. The address received by the NIC over the PCI bus can be considered to be formed of (say) 32 bits which include an aperture definition and a definition of an offset in that aperture. The offset bits are also encoded in the outgoing packet to enable the receiving NIC to write the data relative to the incoming aperture base. In the case of a data write the resulting network packet can be considered to comprise data together with a location definition comprising an offset, an in-index and an indication of the host to which it is addressed. At the receiving NIC at the host this will be considered as instructing writing of the data to the PCI address that corresponds to that aperture, offset by the received offset. In the case of a read request the analogous operation occurs. This feature enables an aperture to be utilized as a circular queue (as described previously) between the applications and avoids the requirement to create a new aperture for each new receive data buffer.

In this implementation the network packet also contains the nonce bits. These are programmed into the aperture mapping during connection setup and are intended to provide additional security, enabling apertures to be reused safely for many connections to different hosts.

The processing of the nonce bits for communications between hosts A and B is as follows:
1. At host A a random number is selected as nonce A.
2. Nonce A is stored in conjunction with an aperture in-index A
3. A connect message is sent to host B to set up communications in the way generally as described above. In this example the message also includes nonce A. Thus the connect message includes port B, in-index A, nonce A.
4. On receiving the connect message host B stores in-index A and nonce A in conjunction with outgoing aperture B.
5. Host B selects a random number as nonce B
6. Nonce B is stored in conjunction with an aperture in-index B
7. An accept message is sent to host B to accept the set up of communications in the way generally as described above. In this example the message also includes nonce B. Thus the accept message includes port B', in-index B, nonce B.
8. Host A stores in-index B and nonce B in conjunction with outgoing aperture A.

Once the connection is set up to include the nonce bits all packets sent from A to B via outgoing $aperture_A$ will contain nonce B. When received the $NIC_B$ will look up in-index B and compare the received nonce value with that programmed at B. If they differ, the packet is rejected. This is very useful if a malfunctioning application holds onto a stale connection: it may transmit a packet which has a valid [host:in-index] address, but would have old nonce bits, and so would be rejected.

Remembering that the user level application has a control block for the out of band queue, this control block can also be used to allow control of the apertures associated with the application, in such a way that connection setup and tear down may be performed entirely at user level.

Note that some parts of the aperture control block only are user programmable, others must only be programmed by the operating system.

User Programmable bits include: nonce bits, destination host bits

O/System Programmable bits include:
a) base address of incoming aperture (this prevents an application from corrupting memory buffers by mistake or malintent)
b) source host bits (this prevents an application from masquerading as originating from another host).

For an untrusted application, kernel connection management would be performed. This means that out of band data would be processed only in the kernel, and no programmable bits would be made available to the application.

Figure 10:
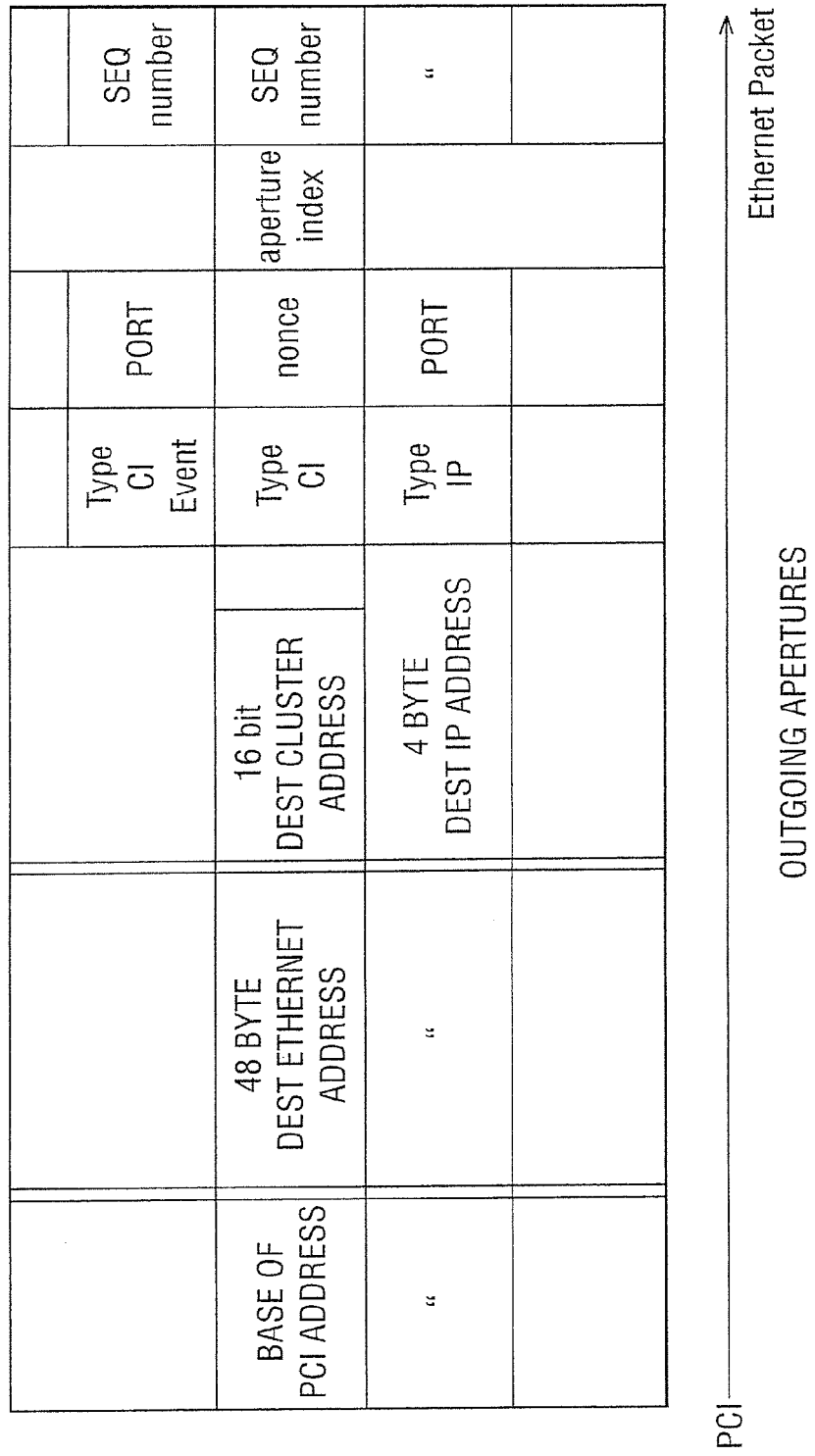
FIG. 10 shows an example of an outgoing aperture table.

An example of an outgoing aperture table is shown in FIG. 10. Each row of the table represents an aperture and indicates the attributes of that aperture. It should be noted that:

1. A number of aperture sizes may be supported. These will be grouped such that the base address also gives the size of the aperture. Alternatively, a size field can be included in the aperture table.
2. The type field indicates the Ethernet type to use for the outgoing packet. It also indicates whether the destination address is a 4 byte IPv4 address or a 16 bit cluster address. (IPv6 addresses or other protocol addresses could equally be accommodated) The type field also distinguishes between event and data packets within the cluster. (An event packet will result in a fixed size event message appearing on the destinations event queue).
3. The PCI base address is OS programmable only, other fields may be programmed by the application at user level depending on the system's security policy.
4. Source Ethernet address, Source IP and Cluster address and possibly other information is common to all entries and stored in per NIC memory.
5. In all cases addressing of the outgoing Ethernet packet is either
   <Ethernet MAC><IP host: IP port> (in the case of a TCP/IP packet) or
   <Ethernet MAC><CI host: CI in-index: CI nonce: CI aperture offset> (in the case of a CI (computer interface) packet)
   (n.b. the offset is derived from the PCI address issued).
6. Each aperture is allocated an initial sequence number. This is incremented by the hardware as packets are processed and are optionally included in cluster address formats An example of an incoming aperture table is shown in FIG. 11. Each row of the table represents an aperture and indicates the attributes of that aperture. The incoming aperture is essentially the reverse of the outgoing aperture. It should be noted that:

1. As well as the size being optionally encoded by having fixed size tables, the EthType can be optionally encoded by grouping separate aperture tables
2. The sequence number fields are optional and the receiver can set
   (a) whether sequence checking should be done
   (b) the value of the initial sequence number
   If done this must also be communicated as part of the connection protocol, which could conveniently be performed in a similar way to the communication of nonce values from one host to another.
3. Similarly to outgoing apertures, some information is Per-NIC e.g. IP address, Ethernet address.
4. For application level robustness it is possible to "narrow" down an aperture by specifying an address and size which specifies a range which lies within the default range. This might be done when the application level data structure is of a size smaller, or different alignment, than the default aperture size and fine grained memory protection is required.
5. The map address is either the PCI address which the NIC should emit in order to write to memory for the aperture, or else a local (to the NIC's SRAM) pointer to the descriptor for the event queue.

Figure 12:
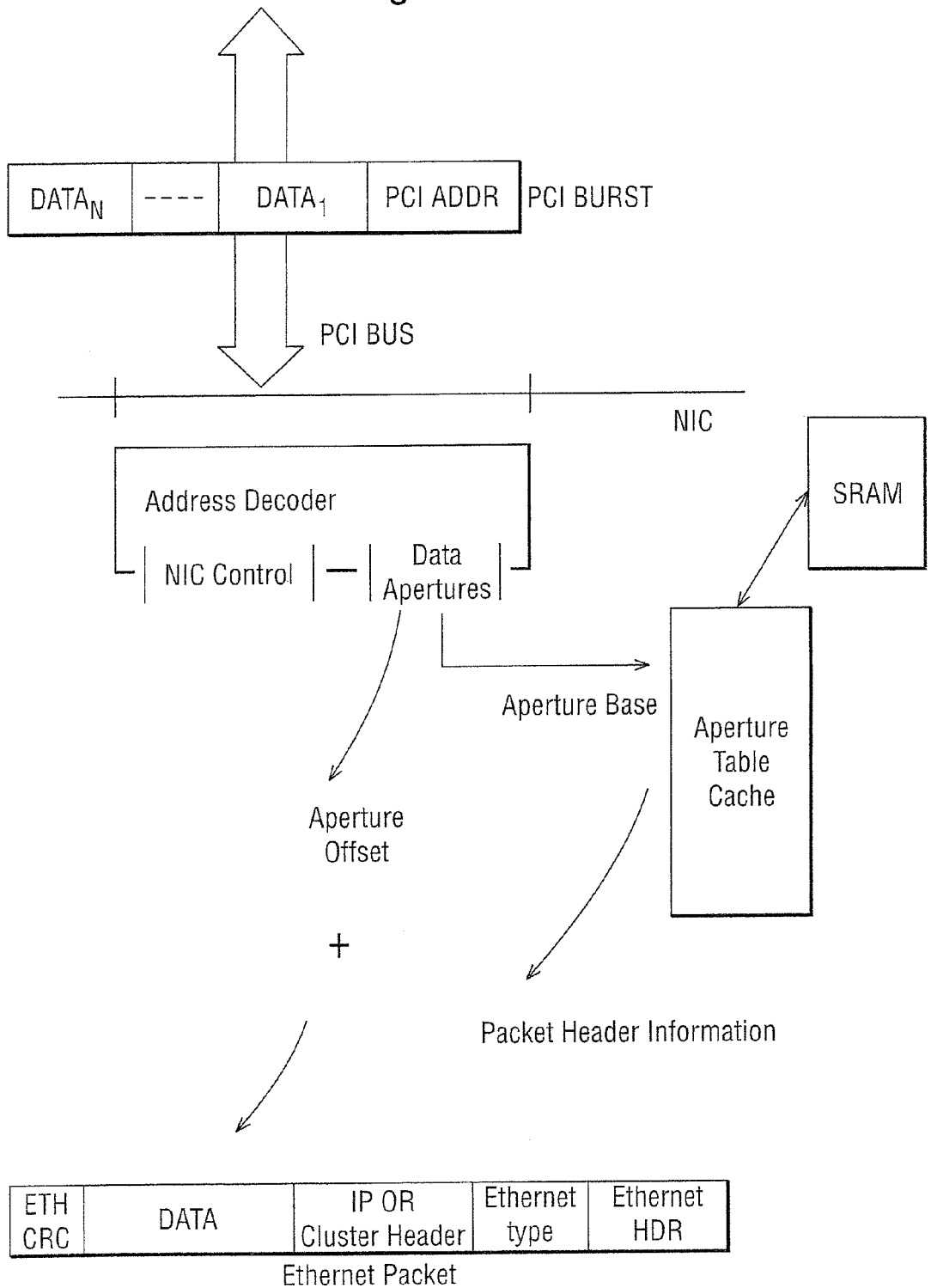
FIG. 12 shows the steps in a PCI write for an outgoing aperture.

A PCI write for an outgoing aperture is processed as shown in FIG. 12. The steps are as follows.

1. A PCI burst is emitted whose address falls within the range allocated to the NIC
2. The NIC's address decoder captures the burst and determines that the address is within the range of the apertures. (It could otherwise be a local control write).
3. Depending on the aperture size (which is coarsely determined from the address), the address is split into <base: offset>. E.g. for a 1 k aperture, the bottom 10 bits would be the offset. The base is fed into the aperture table cache to match the required packet header information.
4. Depending on the Ethernet packet type field either an IP/Ethernet or CI/Ethernet packet header is formed.
5. The CI packet would for instance, include the following fields:
   Data (containing the data payload of the PCI burst)
   Checksum (calculated by hardware over the contents of the header)
   Offset (by the address decoder)
   Sequence number
   Nonce
   Aperture index
   CI Host cluster address
6. If a number of PCI bursts arrive for a particular host, then they may be packed into a single Ethernet frame with compression techniques applied to remove redundant header information
7. In the present system a system-specific CRC or checksum is used to provide end-to-end protection and is appended to the data portion of the packet. Although the Ethernet packet also contains a CRC, it may be removed and recalculated on any hop (e.g. at a switch) and so does not provide protection against internal (e.g. switch-specific) corruptions.
8. If the sequence number is applied, then it is incremented and written back to the aperture table entry For incoming packets, the reverse operation takes place. The incoming aperture is looked up and checked to be:
(a) valid;
(b) sequence number expected matches that of the packet;
(c) nonce matches (or port);
(d) expected Ethernet source address;
(e) expected IP or CI source addresses (which may be specified as a netmask to allow a range of source addresses to be matched);

Any one or more of these checks may be implemented or omitted, depending on the level of security required.

This lookup returns a field of: (base+extent) for the aperture. The offset is checked against the extent to ensure out of aperture access is not made and a PCI write is formed and emitted on the receiver's PCI bus with the format

| ... DATA$_2$ DATA$_1$ | base + offset |
|---|---|

If the PCI bus is stalled, (say on DATA$_N$) a new PCI transaction will be emitted

| ... DATA$_{N+1}$ DATA$_N$ | base + offset + N |
|---|---|

Similarly if consecutive CI data packets arrive they may be coalesced into larger PCI bursts simply by removing the redundant intermediate headers.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. An apparatus comprising:
   a communication interface for providing an interface between a data link and a data processor, the data processor being configured to support an operating system, a virtual address space and one or more logical data ports, the logical data ports existing within the operating system, the communication interface comprising at least one of a processor and circuitry to:
   apply first data received over the link and addressed to one of said one or more logical data ports to a first queue associated with the said one logical data port, said first queue being located in the virtual address space,
   analyse said first data to determine whether said first data meets one or more predefined criteria, wherein one of the predefined criteria is that the handling of said first data directed to said one logical data port is blocked,
   determine, based on said analysis, that the handling of said first data directed to the said one logical data port is blocked, and
   in response to determining that the handling of said first data directed to the said one logical data port is blocked, i) generate a message indicating the said one logical data port, ii) apply the message to a second queue located in the address space of the operating system and iii) transmit an interrupt to the operating system, said address space of said first queue being different to that of the second queue, and in response to determining that the handling of said first data directed to the said one logical data port is not blocked, handling the first data without the operating system.

2. The apparatus as claimed in claim 1, wherein one of the predefined criteria is that the data directed to the said one logical data port matches one or more predetermined message forms.

3. The apparatus as claimed in claim 1, wherein one of the predefined criteria is that the data is indicative of an error condition.

4. The apparatus as claimed in claim 1, wherein the communication interface is arranged to apply to a third queue data received over the link and addressed to the logical data port, and is arranged to apply to the first queue data units received over the link and of a form having a fixed length and to apply to the third queue data units received over the link and of a form having a variable length.

5. The apparatus as claimed in claim 4, wherein the data units of a fixed size include messages received over the link and interpreted by the communication interface as indicating an error status.

6. The apparatus as claimed in claim 4, wherein the data units of a fixed size include messages received over the link and interpreted by the communication interface as indicating a request for or acknowledgement of setup of a connection.

7. The apparatus as claimed in claim 5, wherein the data units of a fixed size include messages received over the link and interpreted by the communication interface as indicating a data delivery event.

8. The apparatus as claimed in claim 1, wherein the communication interface is arranged to analyse the content of each data unit received over the link and to determine in dependence on the content of that data unit which of the said queues to apply the data unit to.

9. The apparatus as claimed in claim 1, wherein the communication interface is configurable by the operating system to set the said criteria.

10. The apparatus as claimed in claim 1, wherein one or both of the communication interface and the operating system is responsive to a message of a predetermined type to return a message including information indicative of the status of the port.

11. A communication system including the apparatus of claim 1 and the data processor, the data processor to set the predefined criteria.

12. The apparatus as claimed in claim 1, wherein the communication interface is arranged to generate the message.

13. The apparatus as claimed in claim 1, wherein the communication interface is further arranged to:
   apply to the second queue data for the particular logical data port and directed to the operating system, said data being indicative of an error condition.

14. The apparatus as claimed in claim 13, wherein said data applied to the second queue is received over the link or is generated by the communication interface.

15. A data processing system comprising: a data processor; and the apparatus of claim 1, wherein the particular logical data port exists within the operating system.

16. A data processing system as claimed in claim 15, wherein the operating system is arranged to analyse the message transmitted to the second queue so as to identify the port and examine the data applied to the first queue.

17. A data processing system comprising:
   an operating system;
   a virtual address space;
   a logical data port being associated with the virtual address space and existing within the operating system; and
   a communication interface for providing an interface between a data link and the data processing system, the communication interface comprising at least one of a processor and circuitry to:
   (i) apply data received over the link and addressed to the logical data port to a first queue associated with the logical data port and located in the virtual address space;
   (ii) analyse the received data to determine whether the received data meets one or more predefined criteria wherein one of the predefined criteria is that the handling of data directed to the logical data port is blocked; and
   in response to determining that the handling of data directed to the said one logical data port is blocked:
   (iii) generate a message indicating the said one logical data port;
   (iv) apply the message to a second queue located in the address space of the operating system; and
   (v) transmit an interrupt to the operating system, wherein said at least one of a processor and circuitry being further arranged to handle the first data without the operating system if the handling of said data directed to the said one logical data port is not blocked, and
   said address space of the first queue being different to that of the second queue.

18. The data processing system of claim 17, wherein said data received over the link is out of band (OOB) data, and
said first queue is an OOB queue.

19. The apparatus of claim 18, wherein said OOB queue has a read pointer and a write pointer, said read pointer being stored in said virtual address space and said write pointer being stored in said communication interface.

20. The apparatus of claim 1, wherein said first data received over the link is out of band (OOB) data, and said first queue is an OOB queue.

21. The apparatus of claim 20, wherein said OOB queue has a read pointer and a write pointer, said read pointer being stored in said virtual address space and said write pointer being stored in said communication interface.

22. An apparatus comprising:

a communication interface for providing an interface between a data link and a data processor, the data processor being capable of supporting an operating system and a user application, the communication interface comprising at least one of a processor and circuitry to:

apply first out of band data received over the link and addressed to one of said one or more logical data ports to a first queue associated with the said one logical data port, said first queue being located in the address space of the user application, said first queue being an out of band queue;

determine if the handling of said first out of band data directed to the said one logical data port is blocked; and in response to determining that the handling of said first data directed to the said one logical data port is blocked, generate a message indicating the said one logical data port, apply the message to a second queue located in the address space of the operating system and additionally transmit an interrupt to the operating system, said address space of said first out of band data queue being different to that of the second queue, and if the handling of the first data directed to the said one logical port is not blocked, handling the first data by the first application.

* * * * *